US008172188B2

(12) United States Patent
Dubinskiy et al.

(10) Patent No.: US 8,172,188 B2

(45) Date of Patent: May 8, 2012

(54) FULLY ADJUSTABLE BRACKET FOR REMOVABLE AND STATIONARY SADDLEBAG SUPPORT SYSTEM

(76) Inventors: Yuriy Dubinskiy, Lake Zurich, IL (US); Alexander Gorokhovsky, Deerfield, IL (US)

( * ) Notice: Subject to any disclaimer, the term of this patent is extended or adjusted under 35 U.S.C. 154(b) by 637 days.

(21) Appl. No.: 12/263,035

(22) Filed: Oct. 31, 2008

(65) Prior Publication Data

US 2009/0152423 A1 Jun. 18, 2009

Related U.S. Application Data

(60) Provisional application No. 60/984,250, filed on Oct. 31, 2007.

(51) Int. Cl.
*A47G 29/00* (2006.01)

(52) U.S. Cl. ................... 248/214; 248/215; 248/221.11; 224/431

(58) Field of Classification Search ............... 248/213.2, 248/214, 215, 221.11, 225.11, 225.21, 300, 248/301, 309.1, 503; 224/430, 431, 441, 224/413, 419, 428, 429, 530, 440, 449, 450, 224/459; 280/288.4
See application file for complete search history.

(56) References Cited

U.S. PATENT DOCUMENTS

| | | | | |
|---|---|---|---|---|
| 4,096,980 | A * | 6/1978 | Clow | 224/441 |
| 5,435,471 | A * | 7/1995 | Chuang | 224/419 |
| 5,558,260 | A * | 9/1996 | Reichert | 224/413 |
| 5,579,971 | A * | 12/1996 | Chuang | 224/430 |
| 6,053,384 | A * | 4/2000 | Bachman | 224/430 |
| 6,293,450 | B1 * | 9/2001 | Aron | 224/430 |
| 6,347,804 | B1 * | 2/2002 | Seibel | 280/288.4 |
| 6,974,175 | B2 * | 12/2005 | Willey | 296/78.1 |

* cited by examiner

*Primary Examiner* — Tan Le
(74) *Attorney, Agent, or Firm* — Cardinal Law Group

(57) ABSTRACT

One embodiment of the present invention relates to an adjustable bracket assembly for mounting to a vehicle. The bracket assembly comprises an integral planar attachment portion, at least one integral mounting portion separate from the planar attachment portion, at least one integral locking portion separate from the attachment portion and at least one integral keeper. The integral planar attachment portion includes a reception portion, wherein at least one of the planar attachment portion and reception portion include at least one slot. The at least one integral attachment mounting portion includes an engaging portion and a mating portion that engages the reception portion, wherein at least the engaging portion is substantially parallel to the planar attachment portion when engaged. The engaging portion includes a receiving portion having diameter "$d_{rc}$" and a radius portion in fluid communication with the receiving portion, the radius portion having diameter "$d_{rd}$", wherein $d_{rc}>d_{rd}$. The at least one integral locking portion engages the attachment portion, and mates with at least the radius portion. The keeper has a diameter "$d_k$", wherein $d_{rd}-d_k=\alpha$. As $\alpha$ approaches a manufacture tolerance, $d_{rd}$ approaches and is substantially equal to $d_k$.

11 Claims, 29 Drawing Sheets

14 42 12 16 88 88 88 88 12 82 40 10 40

14
44
46
48
50
52
54
56

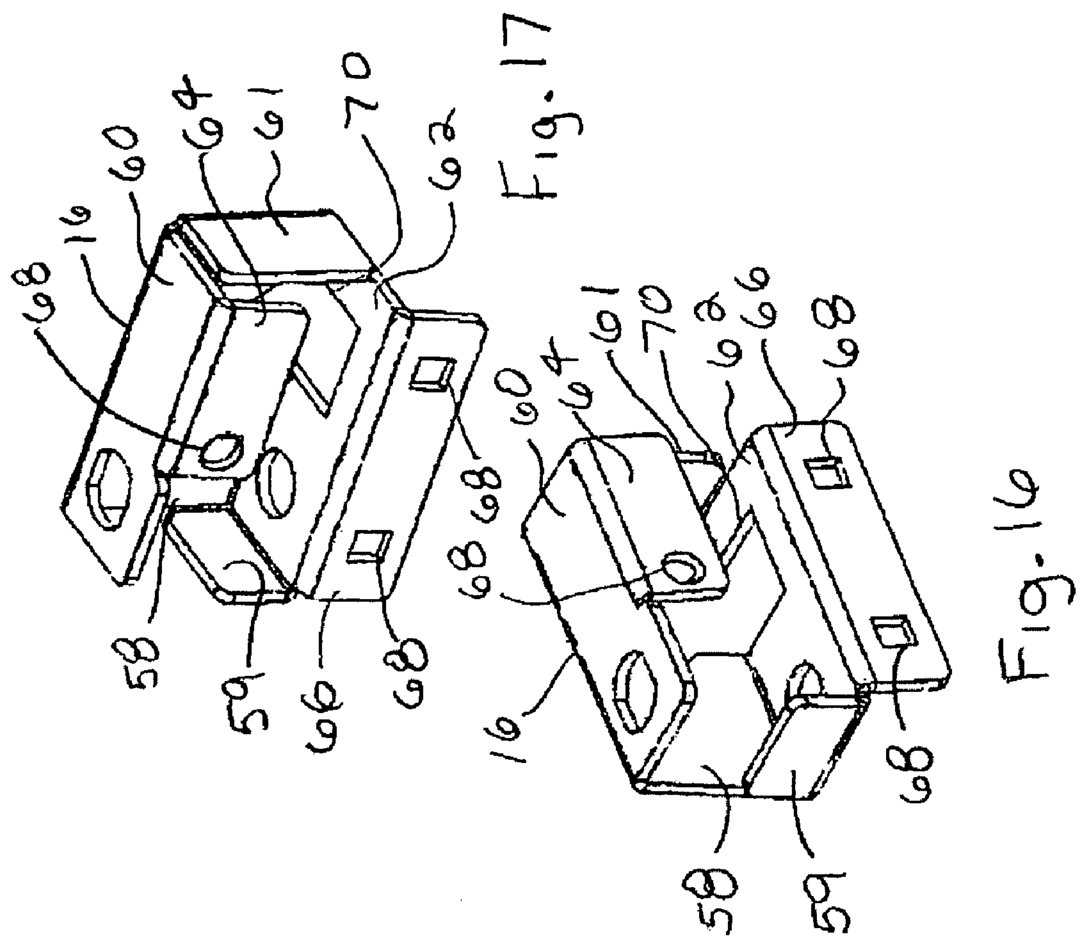
Fig. 17
Fig. 16
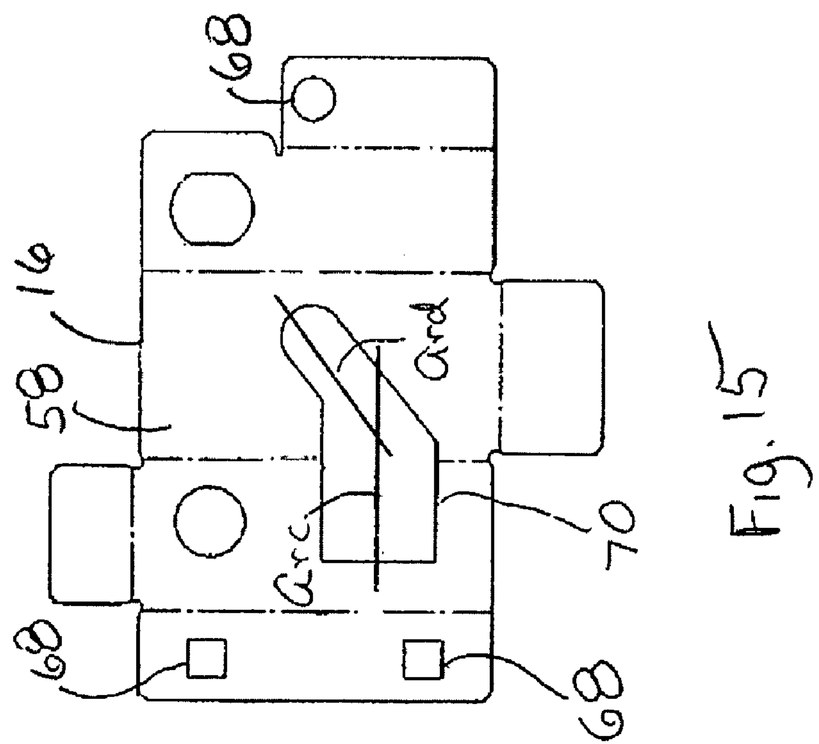
Fig. 15

72
78
76

72
78
76

76
72
78
80
74

72
78
80
74

14
42
10
42
12
42
92
16
42

16
92
42
10
42
42
40
12
40
14
42

16
10
14
12

82
84
88
86
88

88
16
40
12
88
12
10
42
42
40
14
88
82
88

10
12
40
40
70
16
82
42
14
56
82

10
12
40
40
42
14
56
82
82
90
16
70

84
82
88
84
82
88
88
84
82
90
90
dk 86
90
82
88
88
82
90

88
82
88
96
82
86

FULLY ADJUSTABLE BRACKET FOR REMOVABLE AND STATIONARY SADDLEBAG SUPPORT SYSTEM

CLAIM FOR PRIORITY

The present invention relates to, and claims priority from U.S. Provisional Application No. 60/984,250 filed Oct. 31, 2007, the entire document of which is incorporated herein by reference in its entirety.

FIELD OF THE INVENTION

The invention relates to an apparatus and method for attaching a moveable, removable, adjustable bracket assembly to a vehicle. More particularly, the invention relates to a fully moveable, removable, adjustable bracket assembly for moveably, removably, adjustably attaching a saddlebag to a vehicle.

BACKGROUND OF THE INVENTION

Various vehicles, such as, for example, motorcycles or bicycles, use saddlebags. Such saddlebags require an apparatus for mounting. Mounting these saddlebags is generally accomplished using support brackets upon which the saddlebags rest. However, support brackets for saddlebags generally fit one specific type of motorcycle or bicycle and accommodate only one or a very few specific types of saddlebags. Therefore, a dealer has to stock many different varieties of mounting brackets to fit the large variety of available vehicles and different saddlebag types.

Additionally, standard brackets are permanently attached to the vehicle and cannot be easily moved to another vehicle. Not only does this force a vehicle operator to purchase extra brackets for other vehicles, but it also compels the operator to acquire only those saddlebags for which the bracket has been installed. This creates extra costs and inconvenience for both that vehicle dealer and a vehicle user.

Some brackets attempt to solve this problem by creating a bracket with a one side adjustable slider. While these brackets can accommodate different types and sizes of vehicles than non-adjustable ones, they face similar limitations. The fitment on the bracket is limited. If the saddlebag is larger than the bracket can accommodate, the saddlebags may sink to one side. If the bracket is larger then the saddlebag, it may expose sharp metal edges. Either situation can create a dangerous environment for the vehicle user. Additionally, the stationary part of the bracket, as well as the improperly fitted saddlebags, often interfere with vehicle components, such as, for example, seats, fender rails, exhaust pipes and turn signals.

It would therefore be desirable to have a fully adjustable bracket for removable and stationary saddlebag support systems that overcomes the above disadvantages.

SUMMARY OF THE INVENTION

One embodiment of the present invention relates to an adjustable bracket assembly for mounting to a vehicle. In this embodiment, the bracket assembly comprises an integral planar attachment portion, at least one integral mounting portion separate from the planar attachment portion, at least one integral locking portion separate from the attachment portion and at least one integral keeper. The integral planar attachment portion includes a reception portion, wherein at least one of the planar attachment portion and reception portion include at least one slot. The at least one integral attachment mounting portion includes an engaging portion and a mating portion that engages the reception portion, wherein at least the engaging portion is substantially parallel to the planar attachment portion when engaged. The engaging portion including a receiving portion having diameter "$d_{rc}$" and a radius portion in fluid communication with the receiving portion, the radius portion having diameter "$d_{rd}$", wherein $d_{rc}>d_{rd}$. The at least one integral locking portion engages the attachment portion. The at least one integral keeper mates with at least the radius portion, where the keeper has a diameter "$d_k$", wherein $d_{rd}-d_k=\alpha$. As $\alpha$ approaches a manufacture tolerance, $d_{rd}$ approaches and is substantially equal to $d_k$.

In another embodiment, the receiving portion has an axis "$a_{rc}$" and the radius portion has an axis "$a_{rd}$", wherein $a_{rc}$ and $a_{rd}$ define an acute angle. The locking portion comprises at least one locking member to mate with at least the keeper. Further the locking member includes at least one tab to mate with at least one of the receiving portion and the radius portion. The locking member defines at least one slot to mate with a locking device. Additionally the at least one elongated support member mates with the at least one attachment mounting portion.

One other embodiment relates to a method for mounting a saddlebag to a vehicle using an adjustable bracket assembly. The method comprises determining a position for the saddle bag on the vehicle and mounting an elongated support member on the determined position on the vehicle. At least one attachment mounting portion having a mating portion is mounted to a planar attachment portion having a reception portion, wherein the mating portion mates with the reception portion. The saddlebag is mounted to the planar attachment portion and the at least one attachment mounting portion is mounted to the elongated support member; and securing the at least one attachment mounting portion to the elongated support member using at least one locking member.

Other embodiments relate to mounting at least the first and second attachment mounting portions, wherein mounting the attachment mounting portion to the elongated support member comprises engaging at least one of a receiving portion and radius portion. The method further includes mounting the at least one attachment mounting portion to the elongated support member comprises at least one keeper mated to the elongated support member engaging at least one of the receiving portion and radius portion.

Still one other embodiment relates to a method for changing a saddlebag mounted on a vehicle using an adjustable bracket assembly. The method comprises removing the saddle bag mounted in a first mounting position on the vehicle, where the vehicle has an elongated support member attached thereto. A second mounted position is determined, where the first and second mounting positions may be the same or equal, spaced one form the other or located on different vehicles. The saddlebag is mounted to the planar attachment portion having at least one attachment mounting portion attached thereto and the at least one attachment mounting portion is mounted to the elongated support member. The at least one attachment mounting portion is secured to an elongate support member using at least one locking member.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

FIG. 15 depicts a view of the unbent or undeformed second or rear attachment mounting portion of the bracket assembly of FIG. 1 in accordance with one embodiment of the present invention;

FIG. 16 depicts an angled view of the bent or deformed second or rear attachment mounting portion of the bracket assembly of FIG. 1 in accordance with one embodiment of the present invention;

FIG. 17 depicts another angled view of the bent or deformed second or rear attachment mounting portion of the bracket assembly of FIG. 1 in accordance with one embodiment of the present invention;

Throughout the various figures, like reference numbers refer to like elements.

DETAILED DESCRIPTION OF PRESENTLY PREFERRED EMBODIMENTS

Figure 1:
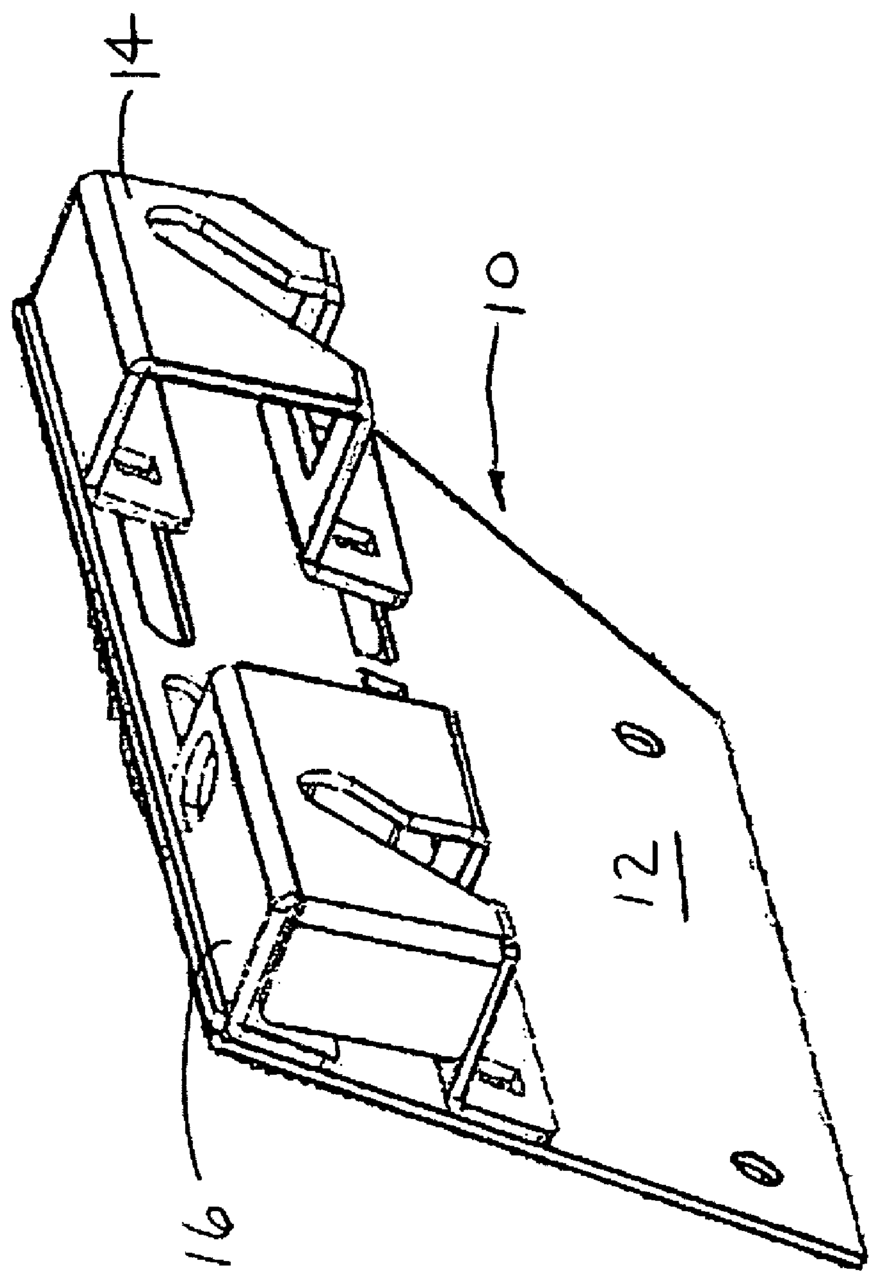
FIG. 1 depicts an angled view of a bracket assembly in accordance with one embodiment of the present invention.

Referring to FIG. 1, an adjustable cycle saddle bag bracket assembly, generally designated 10, is depicted which is adapted to moveably, removably mount a saddle bag 94 (best viewed in FIG. 39) to a vehicle (a motor cycle for example). FIG. 1 depicts the bracket assembly 10 comprises at least one integral planar container attachment portion 12 adapted to receive the saddle bag 94 in a moveably, removable fashion. As illustrated, the bracket assembly 10 further comprises at least one, but generally two, separate and integral attachment mounting portions, first or front attachment mounting portion 14 and the second or rear mounting portion 16 moveably, removably mounted to the container attachment portion 12.

Figure 2:
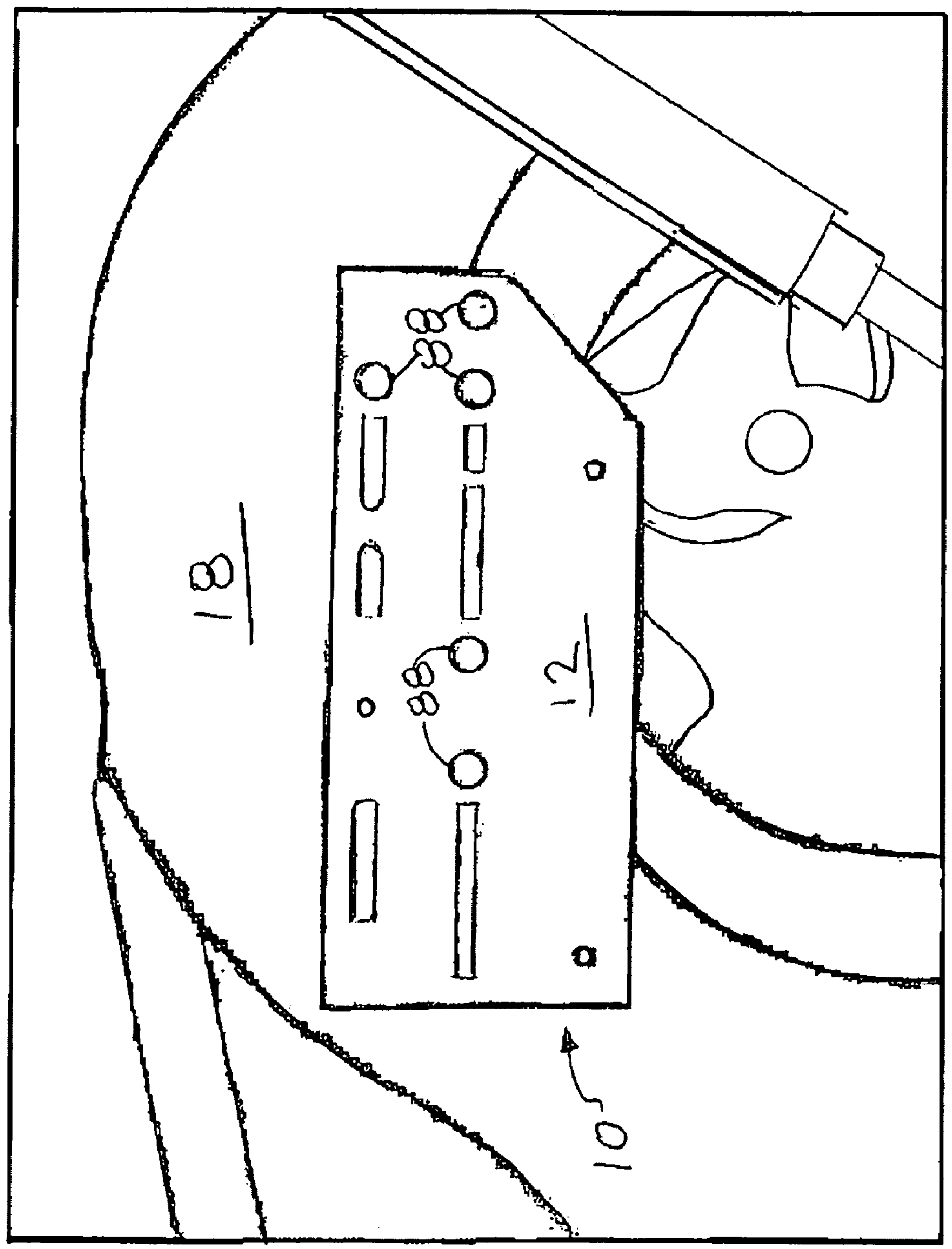
FIG. 2 depicts an elevational view of a bracket assembly mounted in a rearward position on a vehicle in accordance with one embodiment of the present invention.
Figure 3:
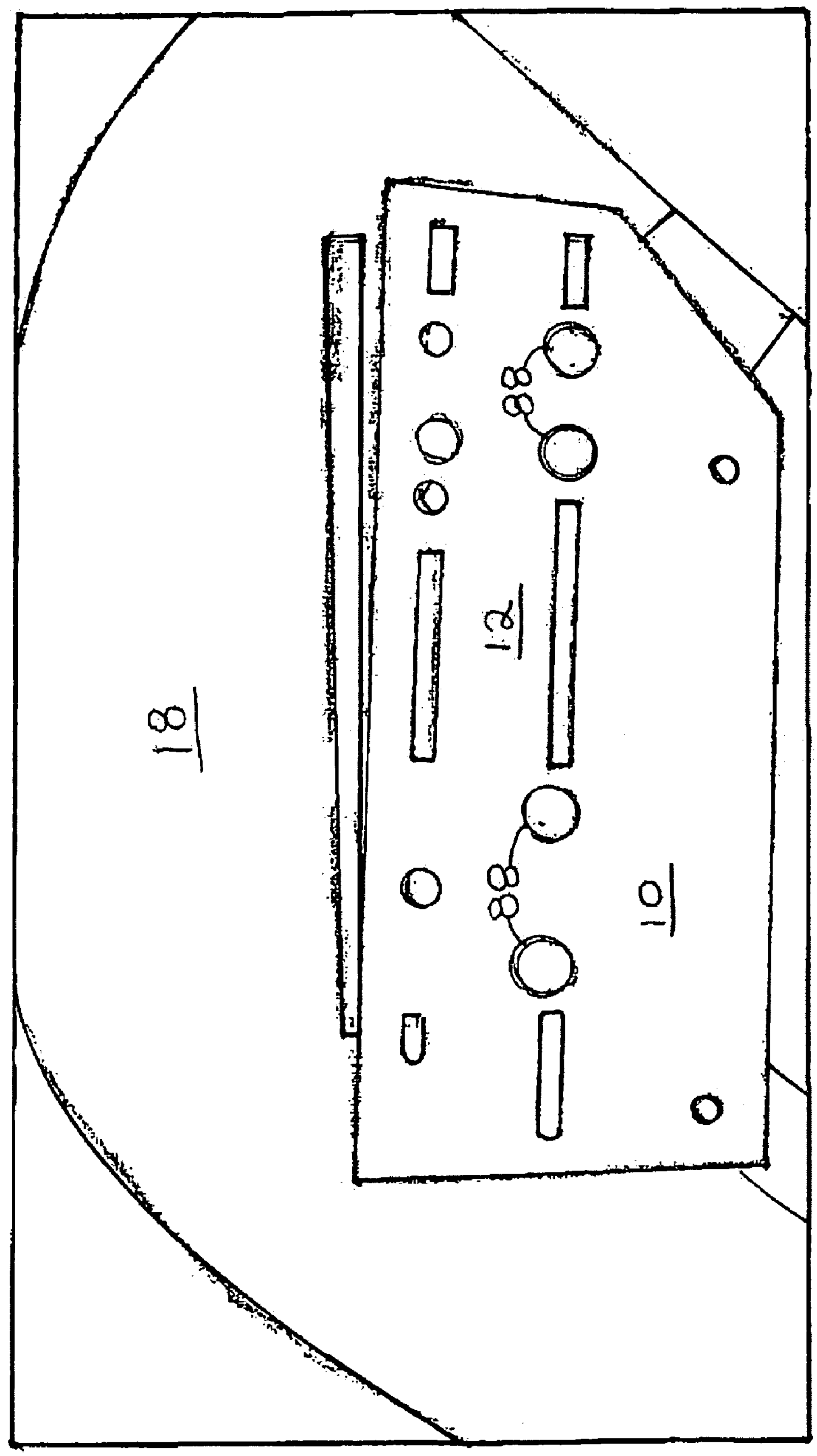
FIG. 3 depicts another elevational view of the bracket assembly of FIG. 1 mounted in a middle position on the vehicle in accordance with one embodiment of the present invention.
Figure 4:
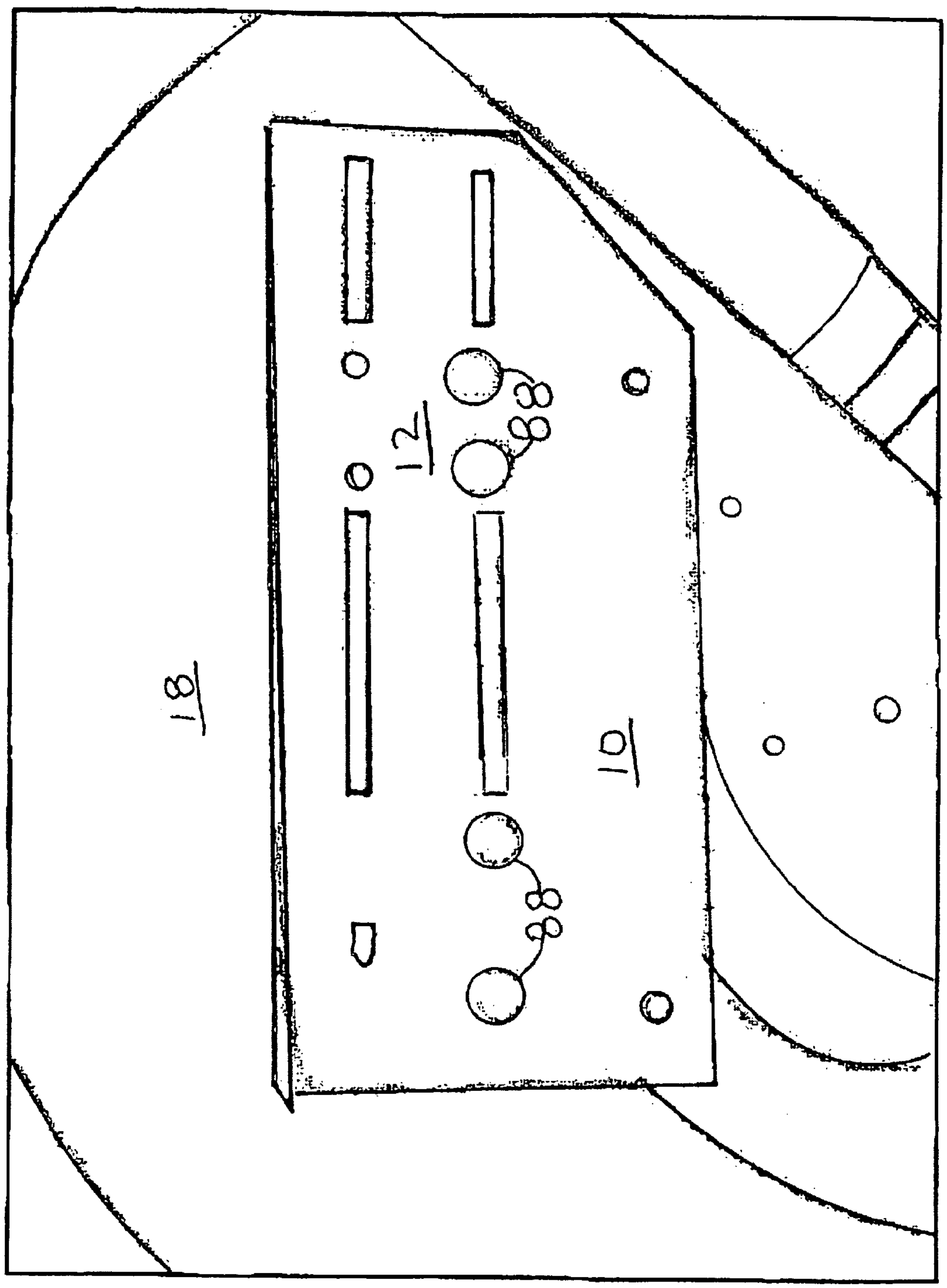
FIG. 4 depicts yet another elevational view of the bracket assembly of FIG. 1 mounted in a forward position on the vehicle in accordance with one embodiment of the present invention.
Figure 5:
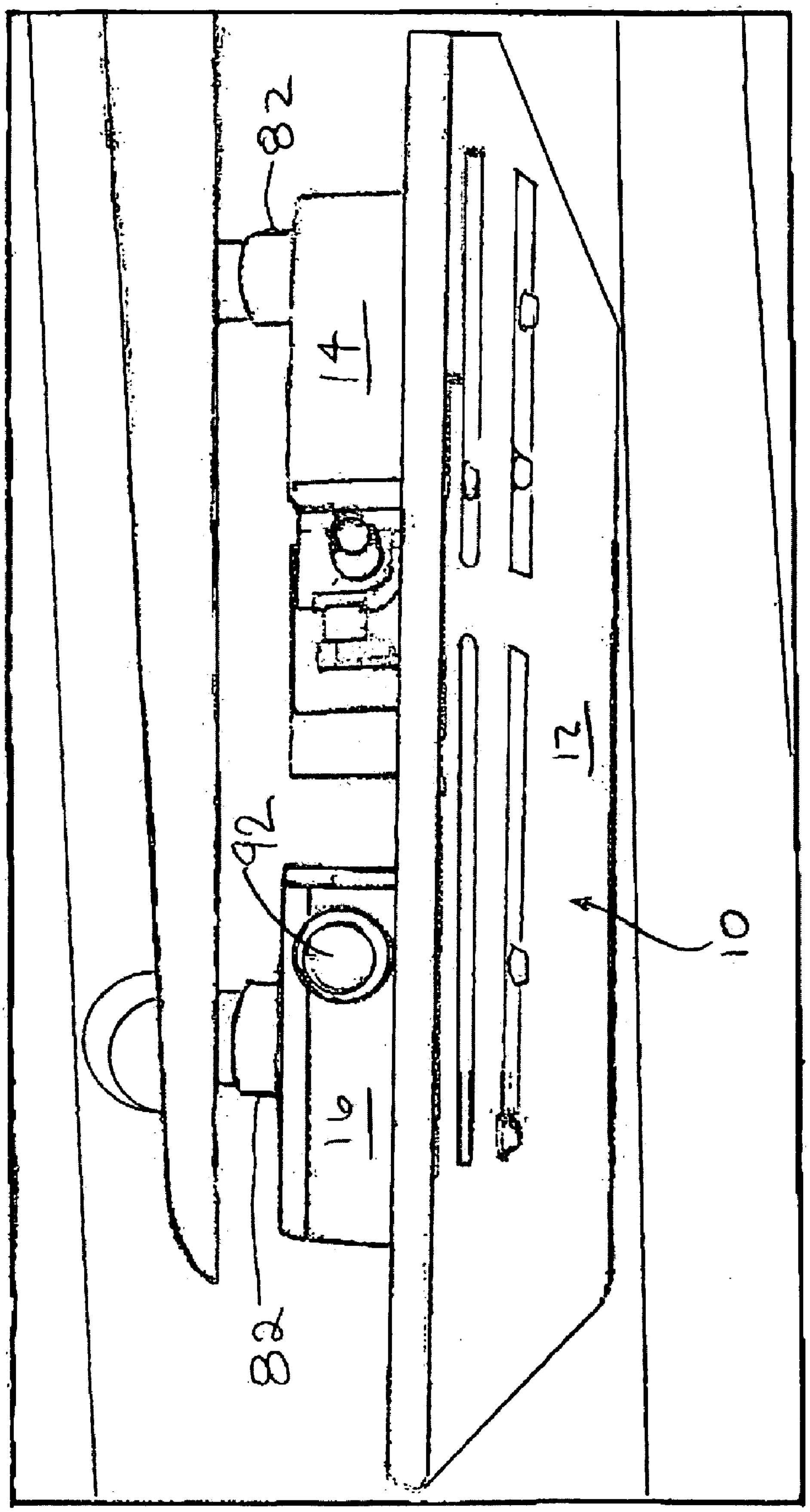
FIG. 5 depicts a top view of the bracket assembly, keepers and fender strut of FIG. 1 in accordance with one embodiment of the present invention.

FIGS. 2-5 depict additional views of the bracket assembly of FIG. 1 mounted to a vehicle 18. FIG. 2 depicts a front elevational view of a bracket assembly 10 mounted in a rearward position on a vehicle 18. FIG. 3 depicts a front elevational view of the bracket assembly 10 mounted in a middle position on the vehicle 18 in accordance with one embodiment of the present invention. FIG. 4 depicts a front elevational view of the bracket assembly 10 mounted in a forward position on the vehicle 18. FIG. 5 depicts a top view of the bracket assembly 10. In the embodiment illustrated in FIGS. 2-5, the bracket assembly 10 is mounted to the vehicle 18 using one or more bolts 88, keepers 82, fender strut 86 and lock 92.

Figures 6, 7, 8, 9:
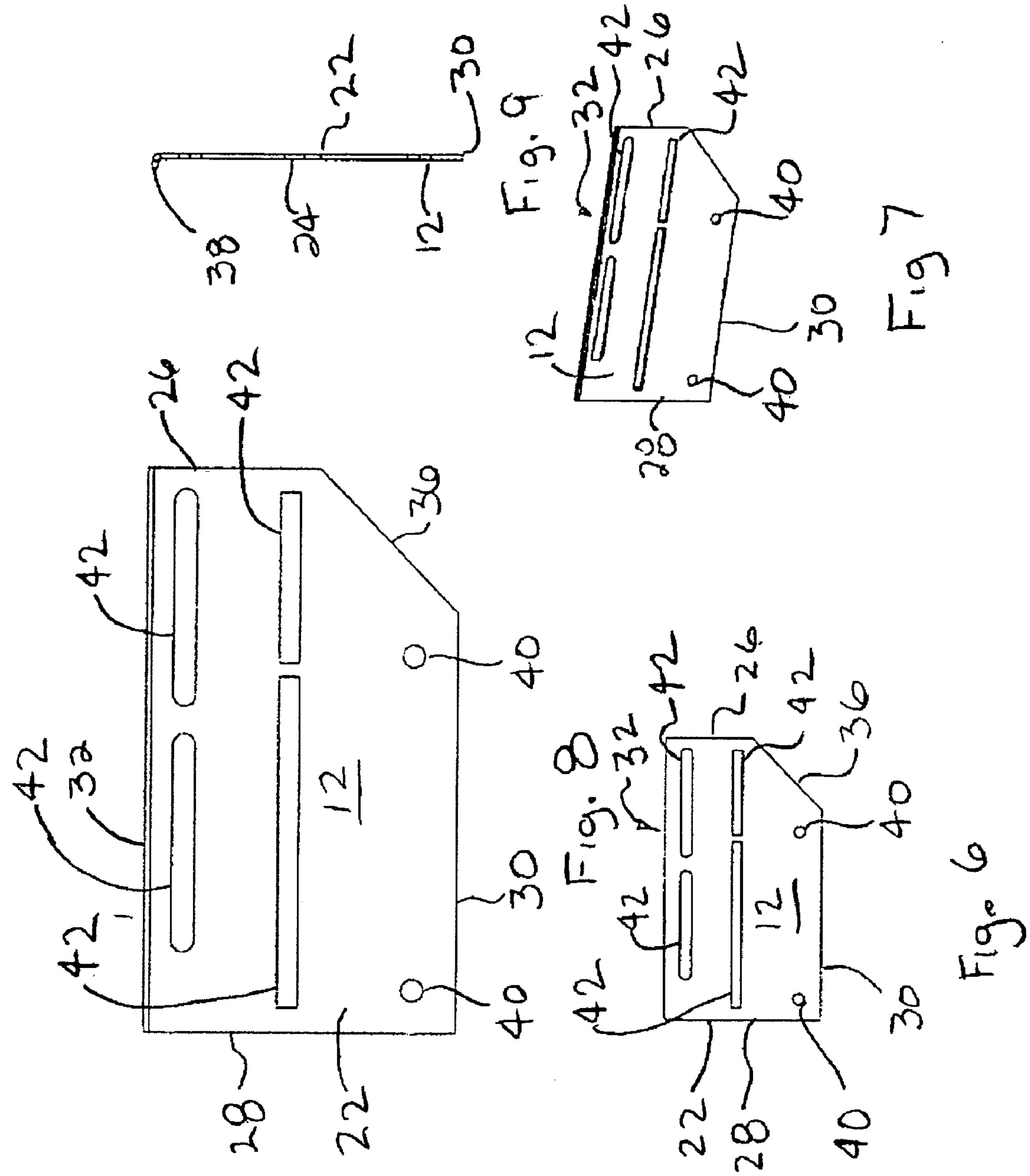
FIG. 6 depicts a view of the container attachment portion of the bracket assembly of FIG. 1 in accordance with one embodiment of the present invention.
FIG. 7 depicts another view of the container attachment portion of the bracket assembly of FIG. 1 in accordance with one embodiment of the present invention.
FIG. 8 depicts an enlarged view of the container attachment portion of FIGS. 6 and 7 in accordance with one embodiment of the present invention.
FIG. 9 depicts a side elevational view of the container attachment portion of the bracket assembly of FIG. 1 in accordance with one embodiment of the present invention.

FIGS. 6-9 depict additional views of the container attachment portion 12 of the bracket assembly 10 of FIG. 1 in accordance with one embodiment of the present invention. FIG. 6 depicts a view of the container attachment portion 12 of the bracket assembly 10 in accordance with one embodiment of the present invention; FIG. 7 depicts another view of the container attachment portion 12 of the bracket assembly 10; FIG. 8 depicts an enlarged view of the container attachment portion 12 of FIG. 7; while FIG. 9 depicts a side elevational view of the bracket assembly 12.

FIGS. 6-9 demonstrate that the bracket assembly 10 is substantially planar having opposing first and second surfaces 22 and 24 (best view in FIG. 9). Container attachment portion 12 is substantially rectangular having a first set of opposing parallel sides 26 and 28, a second set of opposing parallel sides 30 and 32, and end 36 which is not parallel to any of sides 26, 28, 30 and 32. Container attachment portion 12 further comprises a lip 38 (best viewed in FIG. 9) which extends outwardly from second surface 24. As illustrated in FIG. 9, lip 38 extends outwardly from outwardly second surface 32 at about a 90 degree angle thereto, although other angles are contemplated.

Container attachment portion 12 further defines at least one, but generally a plurality of, openings or holes therein. As illustrated, container attachment portion 12 comprises a plurality of mounting means or holes 40 adapted to mount the container attachment portion 12 to the saddlebag 94 in a moveable, removeable fashion and a plurality of attachment means or holes 42 adapted to attach the mounting portions 14 and 16 thereto in a moveable, removable fashion. It is contemplated that mounting and attachment holes 40 and 42 may have many different shapes including round, oval and rectangular.

Figures 10, 11, 12, 13, 14:
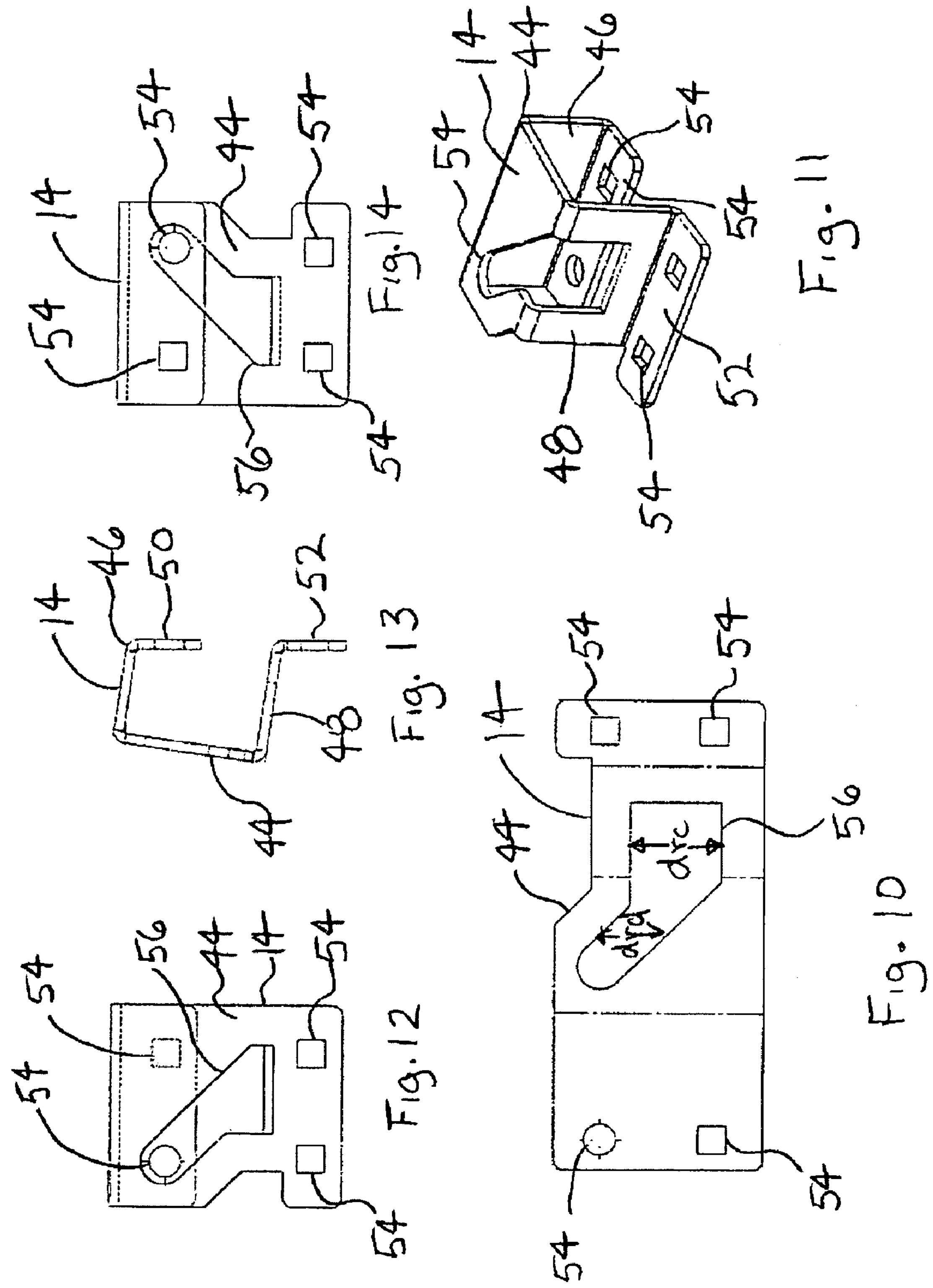
FIG. 10 depicts a view of the unbent or undeformed first or front attachment mounting portion of the bracket assembly of FIG. 1 in accordance with one embodiment of the present invention.
FIG. 11 depicts an angled view of the bent or deformed first or front attachment mounting portion of the bracket assembly of FIG. 1 in accordance with one embodiment of the present invention.
FIG. 12 depicts a view of the bent or deformed first or front attachment mounting portion of the bracket assembly of FIG. 1 in accordance with one embodiment of the present invention.
FIG. 13 depicts a side view of the bent or deformed first or front attachment mounting portion of the bracket assembly of FIG. 1 in accordance with one embodiment of the present invention.
FIG. 14 depicts another view of the bent or deformed first or front attachment mounting portion of the bracket assembly of FIG. 1 in accordance with one embodiment of the present invention.

FIGS. 10-14 depict various views of the first or front attachment mounting portion 14 of the bracket assembly 10 in accordance with one embodiment of the present invention. FIG. 10 depicts a view of the unbent or undeformed first or front attachment mounting portion 14 of the bracket assembly of FIG. 1, while FIGS. 11-14 depict the first or front attachment mounting portion of the bracket assembly 14 in a bent or deformed position.

As illustrated, in the bent or deformed position, first mounting portion 14 comprises a plurality of generally planar surfaces 44, 46, 48, 50, 52. First planar surface 44 is formed on a plane that, when the first mounting portion 14 is mounted to the container attachment portion 12 (using nuts and bolts for example), would be parallel, or at a predetermined angle, thereto. Second and third planar surfaces 46 and 48 are formed substantially parallel to each other and extending from first planar surface 44 at a predetermined angle. In one embodiment, second and third planar surfaces 46 and 48 extend from first planar surface 44 at about 90 degrees thereto (best viewed in FIG. 13). Fourth and fifth planar surfaces 50 and 52 are formed substantially co-planar with each other and extending from second and third planar surfaces 46 and 48 at a predetermined angle. In one embodiment, fourth and fifth planar surfaces 50 and 52 extend from second and third planar surfaces 46 and 48 at about 90 degrees thereto (best viewed in FIG. 13).

First mounting portion 14 further defines at least one, but generally a plurality of, openings or holes therein. At illustrated, first mounting portion 14 comprises a plurality of mounting means or holes 54 adapted to mount the first mounting portion 14 to the container attachment portion 12 in a moveable, removeable fashion and a plurality of attachment means, holes or slots 56 adapted to engage a keeper 82 (best viewed in FIGS. 32 and 33) in a slideably moveable, removable fashion. It is contemplated that mounting and attachment holes 54 and 56 may have many different shapes including round, oval and rectangular.

FIG. 10 depicts slot 56 having an engaging portion with diameter "$d_{rc}$" and a radius portion in fluid communication with the receiving portion, the radius portion having diameter "$d_{rd}$", wherein $d_{rc}>d_{rd}$. The at least one integral keeper having diameter "$d_k$" (best viewed in FIG. 35), wherein $d_{rd}-d_k=\alpha$ (or gap), initially engages or mates with engaging portion and then the radius portion. As the keeper moves from the engaging portion towards the receiving portion, $\alpha$ decrease, moving towards 0 or a manufacture's tolerance In other words, as $\alpha$ or gap approaches 0 or the manufacture's tolerance, $d_{rd}$ approaches and is substantially equal to $d_k$.

FIGS. 15-17 depict various views of the second or rear attachment mounting portion 16 of the bracket assembly 10 of FIG. 1 in accordance with one embodiment of the present invention. FIG. 15 depicts a view of the unbent or undeformed second or rear attachment mounting portion 16; while FIGS. 16 and 17 depict different angled views of the bent or deformed second or rear attachment mounting portion 16. FIG. 15 further illustrates the receiving portion has an axis "$a_{rc}$" and the radius portion has an axis "$a_{rd}$", wherein $a_{rc}$ and $a_{rd}$ define an acute angle.

As illustrated, in the bent or deformed position, second mounting portion 16 comprises a plurality of generally planar surfaces 58, 60, 62, 64, 66. First planar surface 58 is formed on a plane that, when the second mounting portion 16 is mounted to the container attachment portion 12 (using nuts and bolts for example), would be parallel, or at a predetermined angle thereto. Second and third planar surfaces 60 and 62 are formed substantially parallel to each other and extending from first planar surface 58 at a predetermined angle. In one embodiment, second and third planar surfaces 60 and 62 extend from first planar surface 58 at about 90 degrees thereto (best viewed in FIGS. 16 and 17). Fourth and fifth planar surfaces 64 and 66 are formed substantially co-planar with each other and extending from second and third planar surfaces 60 and 62 at a predetermined angle. In one embodiment, fourth and fifth planar surfaces 64 and 66 extend from second and third planar surfaces 60 and 62 at about 90 degrees thereto (best viewed in FIGS. 16 and 17).

Second portion 16 further defines at least one, but generally a plurality of, openings or holes therein. At illustrated, second mounting portion 16 comprises a plurality of mounting means or holes 68 adapted to mount the second mounting portion 16 to the container attachment portion 12 in a moveable, removeable fashion and a plurality of attachment means, holes or slots 70 adapted to engage one or more keepers 82 in a slideably moveable, removable fashion. It is contemplated that mounting and attachment holes 68 and 70 may have many different shapes including round, oval and rectangular.

Figures 18, 19, 20, 21:
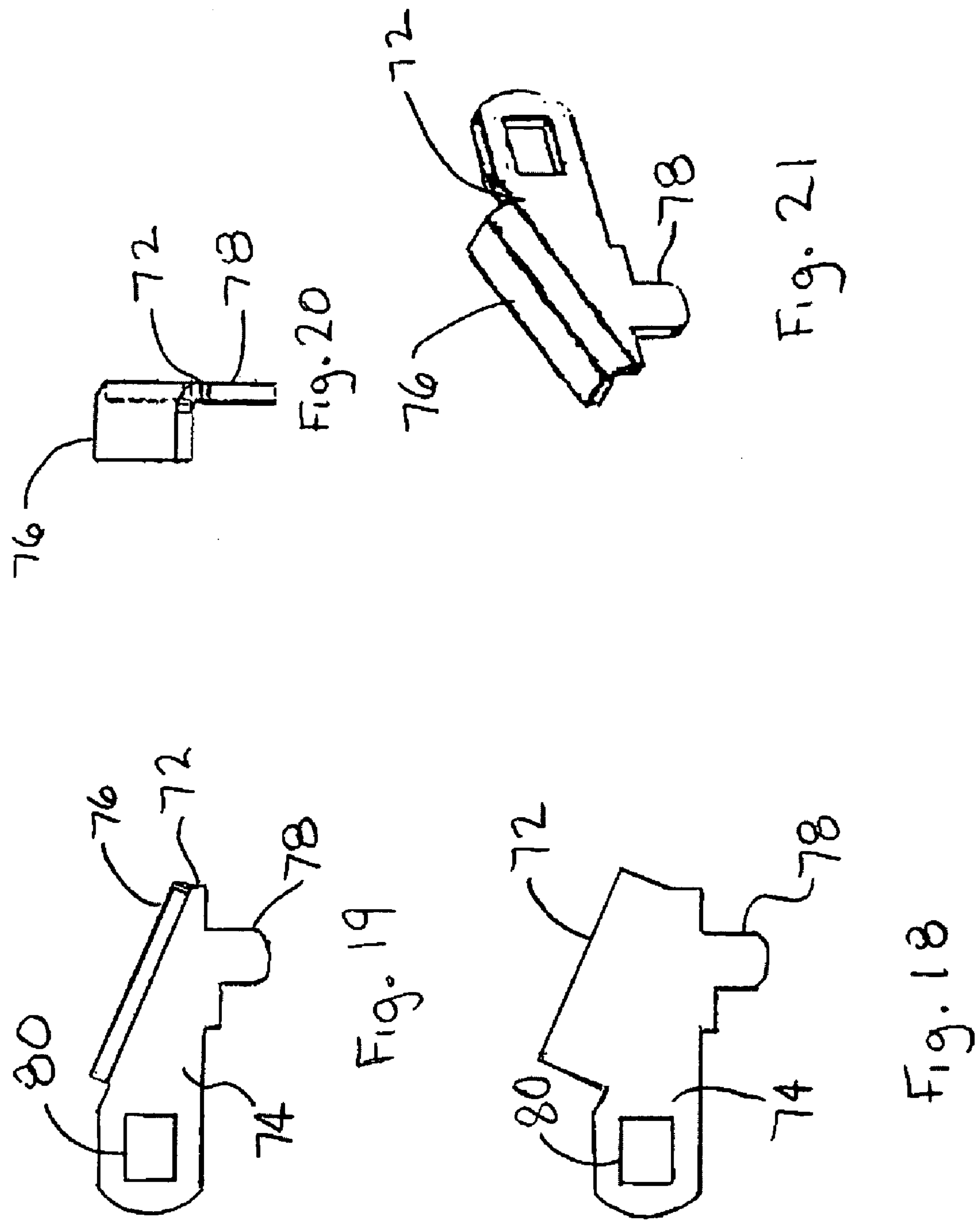
FIG. 18 depicts a view of the unbent or undeformed locking arm used with the attachment mounting portions of the bracket assembly of FIG. 1 in accordance with one embodiment of the present invention.
FIG. 19 depicts an elevational view of the bent or deformed locking arm used with the attachment mounting portions of the bracket assembly of FIG. 1 in accordance with one embodiment of the present invention.
FIG. 20 depicts a side elevational view of the bent or deformed locking arm used with the attachment mounting portions of the bracket assembly of FIG. 1 in accordance with one embodiment of the present invention.
FIG. 21 depicts an angled view of the bent or deformed locking arm used with the attachment mounting portions of the bracket assembly of FIG. 1 in accordance with one embodiment of the present invention.

FIGS. 18-21 depict various views of the locking arm 72 adapted to removably engage the first and second attachment mounting portions 14 and 16 of the bracket assembly 10 of FIG. 1 in accordance with one embodiment of the present invention. FIG. 18 depicts a view of the unbent or undeformed locking arm 72; FIG. 19 depicts an elevational view of the bent or deformed locking arm 72; FIG. 20 depicts a side view of the bent or deformed locking arm 72; while FIG. 21 depicts an angled view of the bent or deformed locking arm 72.

As illustrated, locking arm 72 comprises planar portion 74 having lip 76 extending outwardly therefrom at least a portion thereof. In at least one embodiment, lip 76 forms an angle of about 90 degrees with respect to the planar portion 74. Locking arm 72 further comprises at least one tab 78 extending therefrom proximate one end and defines a hole 80 at opposite end thereof.

The locking arm 72 is coupled to at least the second mounting portion 16 that attaches to the bracket 10 and subsequently the saddlebag. When, in at least one embodiment, the first and second mounting portions 14 and 16 moveably, slideably engage the keepers 82, the locking arm 72 (tab 78 for example) engages the slots 84 on the keepers 82 (that sit permanently on the vehicle 18), keep it from disengaging form or coming out of first and second mounting portions 14 and 16.

Figure 22:
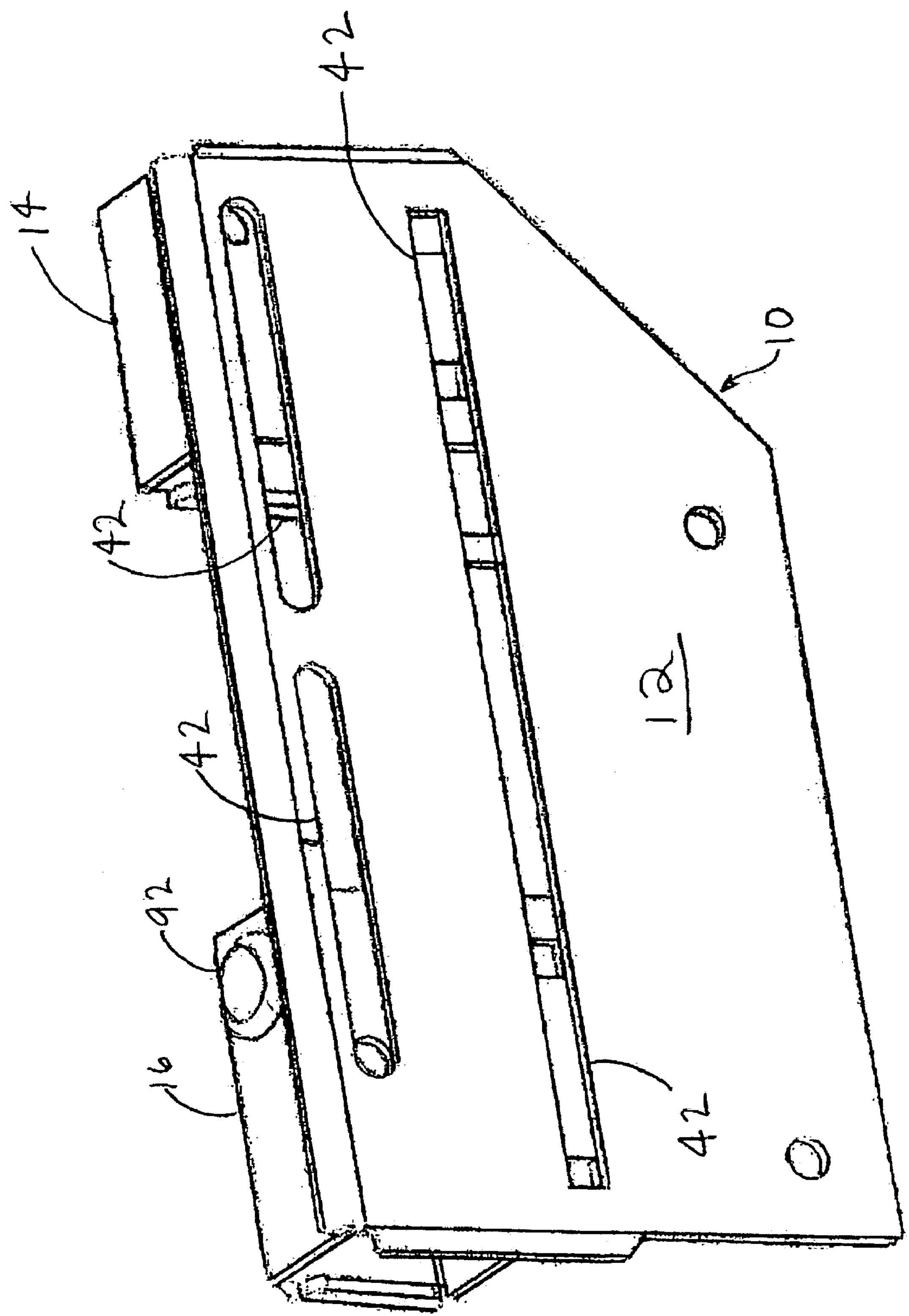
FIG. 22 depicts an angled view of the bracket assembly of FIG. 1 in accordance with one embodiment of the present invention.
Figure 23:
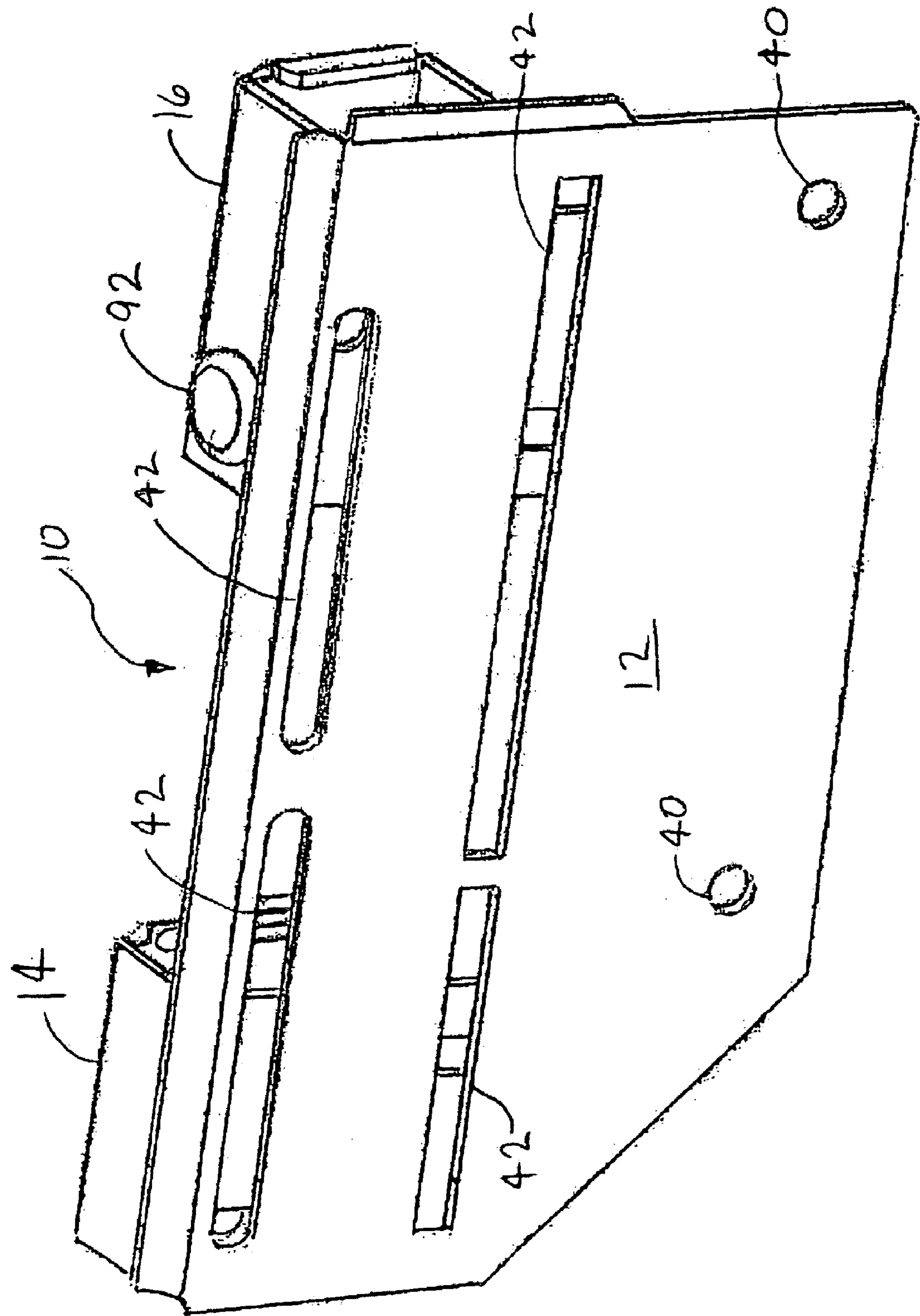
FIG. 23 depicts another angled view of the bracket assembly of FIG. 1 in accordance with one embodiment.
Figure 24:
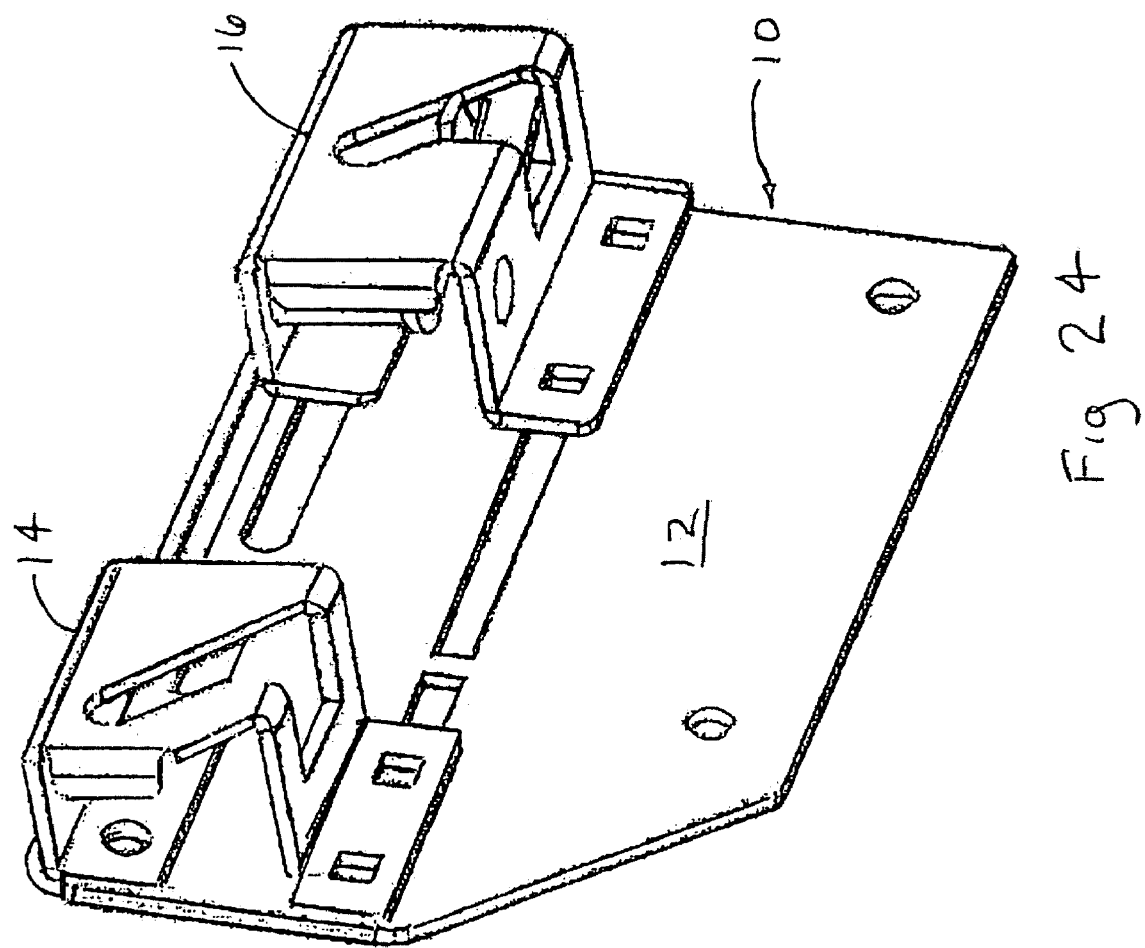
FIG. 24 depicts an angled view of the rear of the bracket assembly of FIG. 1 in accordance with one embodiment of the present invention.
Figure 25:
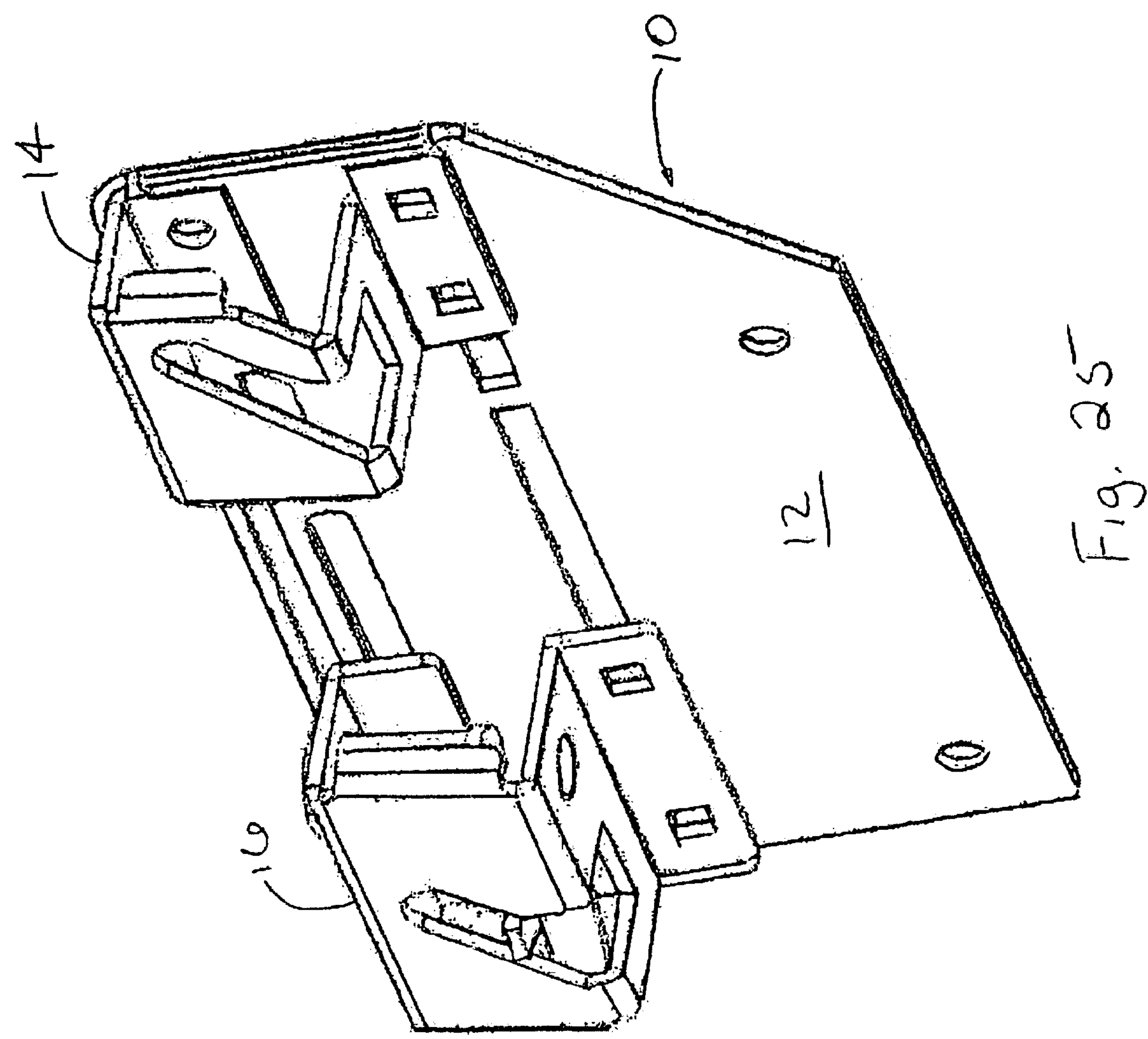
FIG. 25 depicts another angled view of the rear of the bracket assembly of FIG. 1 in accordance with one embodiment.
Figure 26:
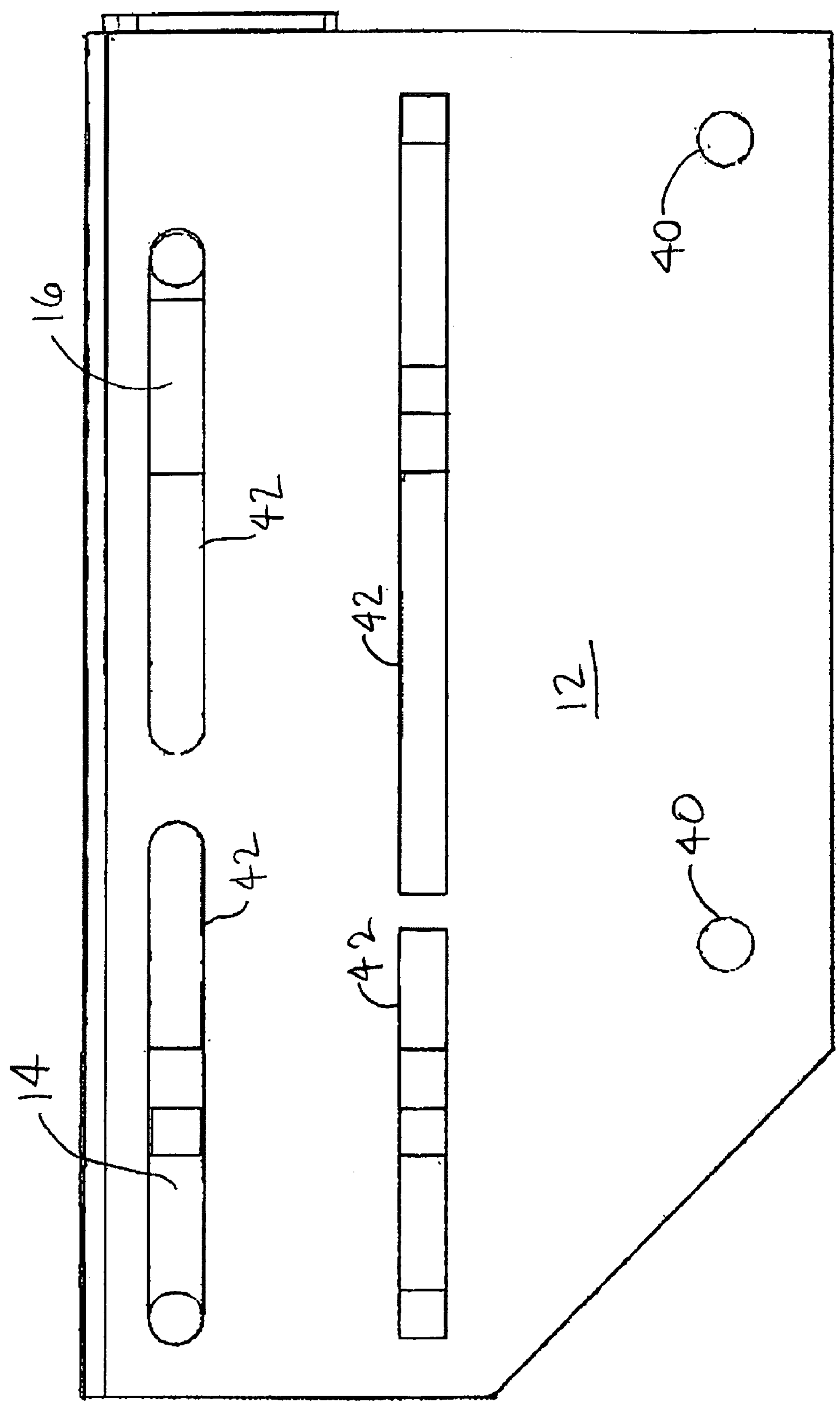
FIG. 26 depicts an enlarged view of the front of the bracket assembly of FIG. 1 in accordance with one embodiment.
Figure 27:
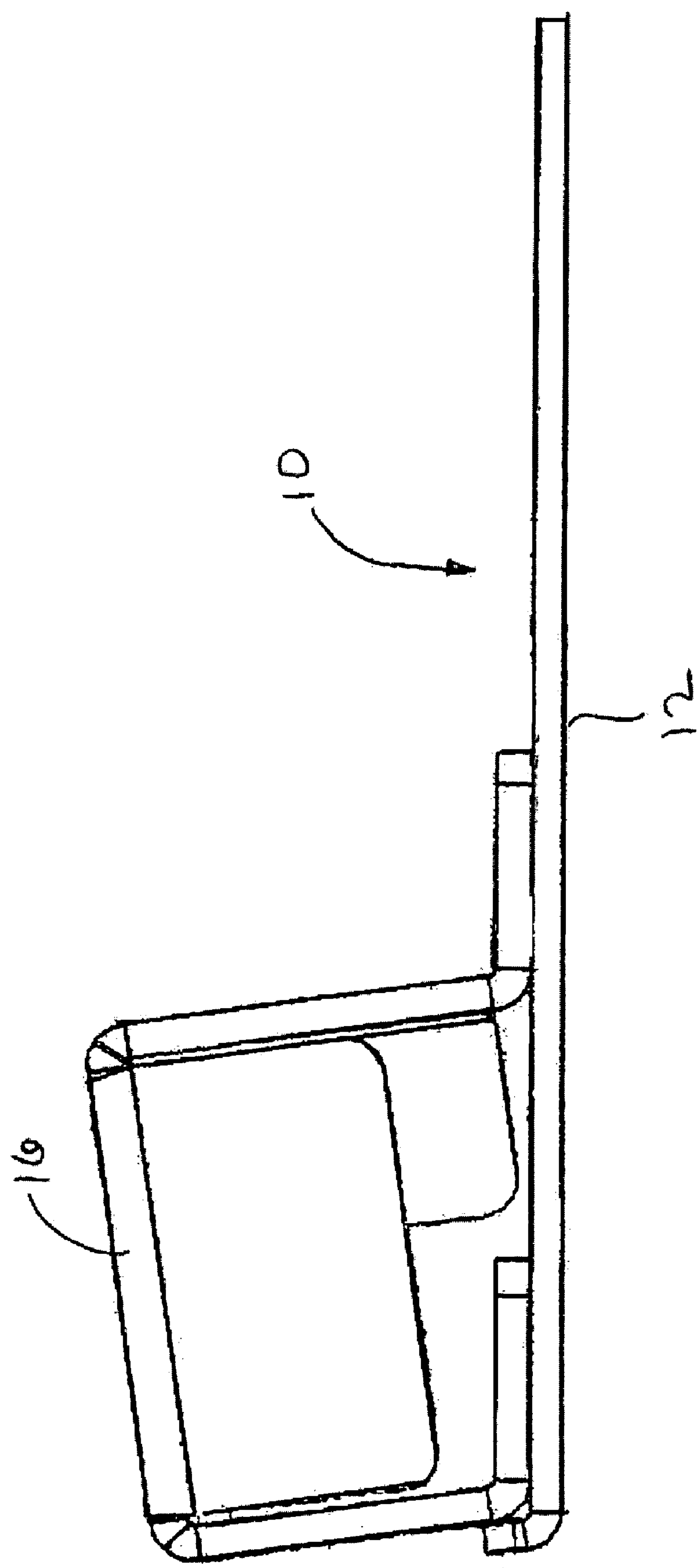
FIG. 27 depicts an enlarged side view of the bracket assembly of FIG. 1 in accordance with one embodiment.
Figure 28:
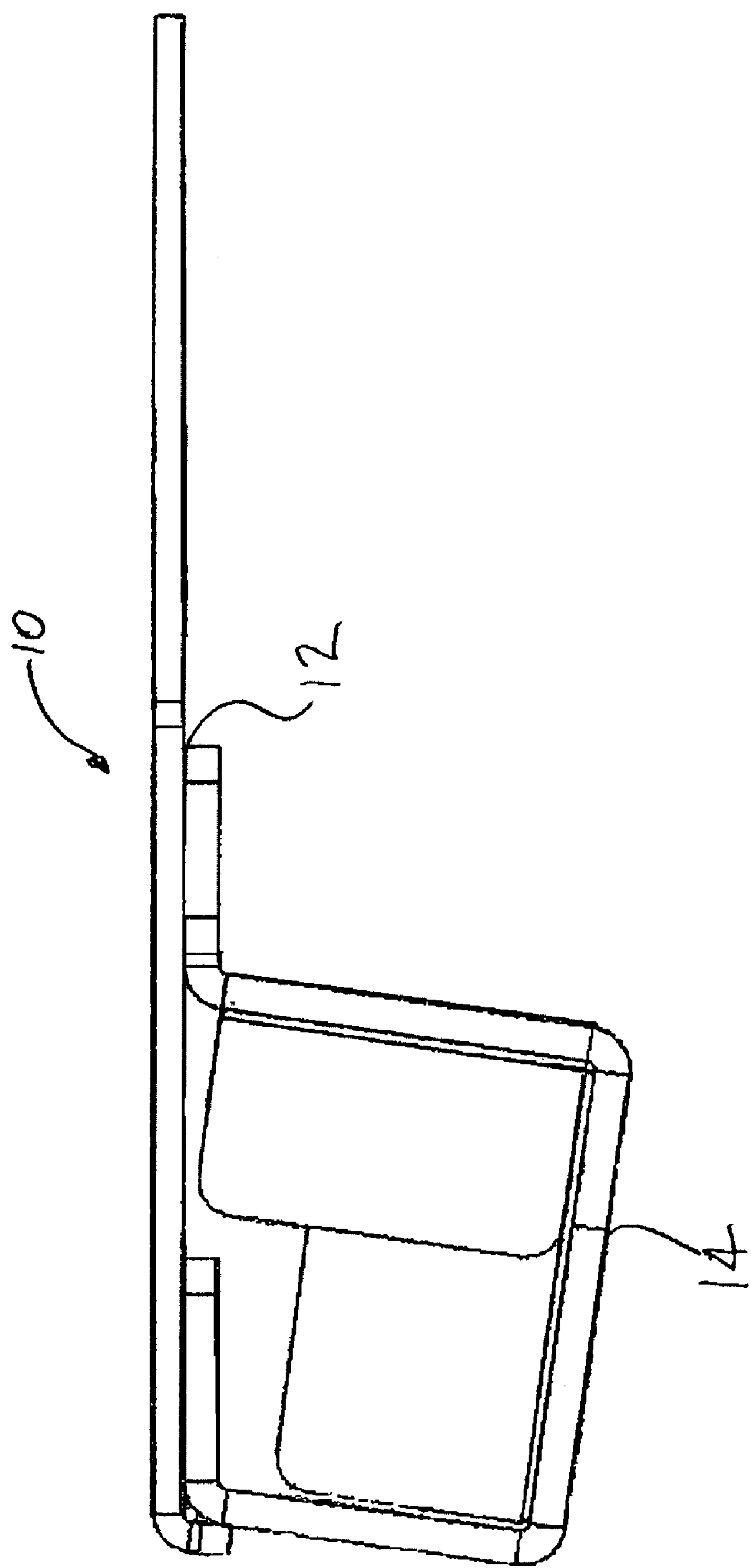
FIG. 28 depicts an opposing side view of the bracket assembly of FIG. 27 in accordance with one embodiment.
Figure 29:
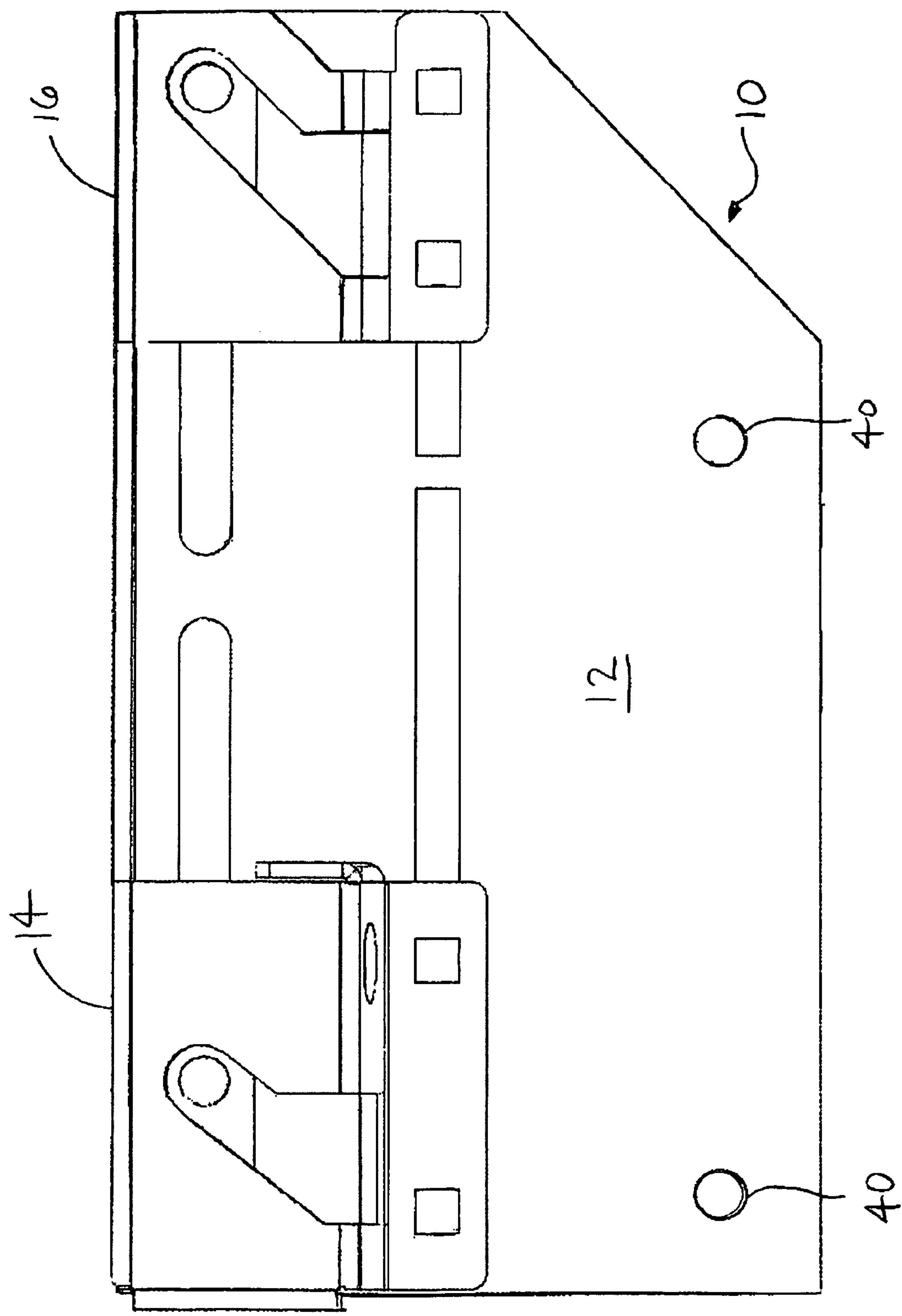
FIG. 29 depicts an enlarged view of the rear of the bracket assembly of FIG. 1 in accordance with one embodiment.
Figure 30:
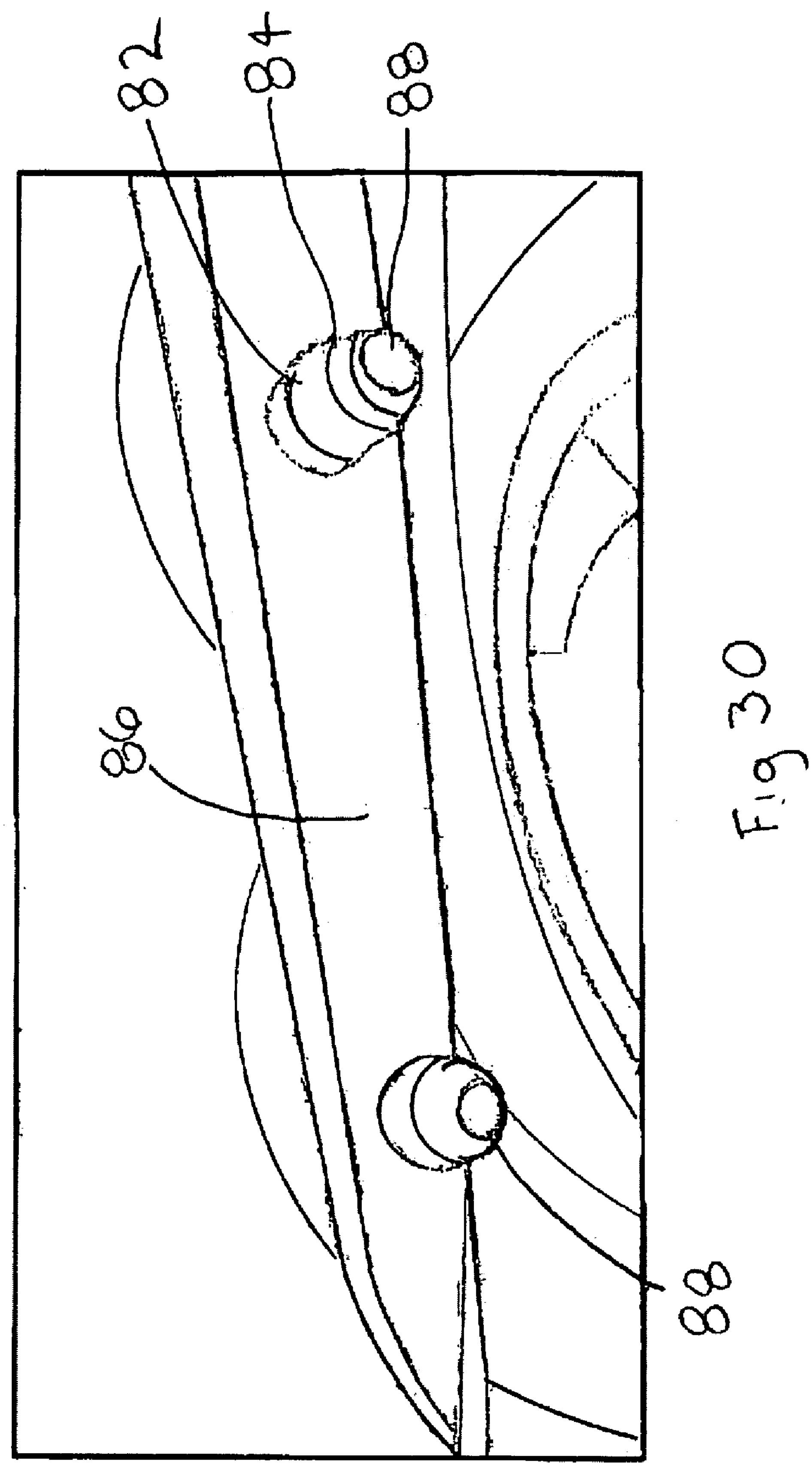
FIG. 30 depicts one embodiment of the keepers mounted to the vehicle.

FIGS. 22-29 depict various views of the bracket assembly 10 in accordance with one embodiment. FIG. 22 depicts an angled view of the bracket assembly of FIG. 1 in accordance with one embodiment of the present invention; FIG. 23 depicts another angled view of the bracket assembly of FIG. 1 in accordance with one embodiment; FIG. 24 depicts an angled view of the rear of the bracket assembly of FIG. 1 in accordance with one embodiment of the present invention; FIG. 25 depicts another angled view of the rear of the bracket assembly of FIG. 1 in accordance with one embodiment; FIG. 26 depicts an enlarged plan view of the front of the bracket assembly of FIG. 1 in accordance with one embodiment; FIG. 27 depicts an enlarged end view of the bracket assembly of FIG. 1 in accordance with one embodiment; FIG. 28 depicts an opposing end vide of the bracket assembly of FIG. 27 in accordance with one embodiment; while FIG. 29 depicts an enlarged plan view of the rear of the bracket assembly of FIG. 1 in accordance with one embodiment; and FIG. 30 depicts one embodiment of the keepers 82 mounted to the vehicle 18. In at least one embodiment, the keepers 82 are coupled or attached to the vehicle 18 using bolts, glue or other mounting means. The bracket assembly 10 is then mounted to the keepers 82.

Figure 31:
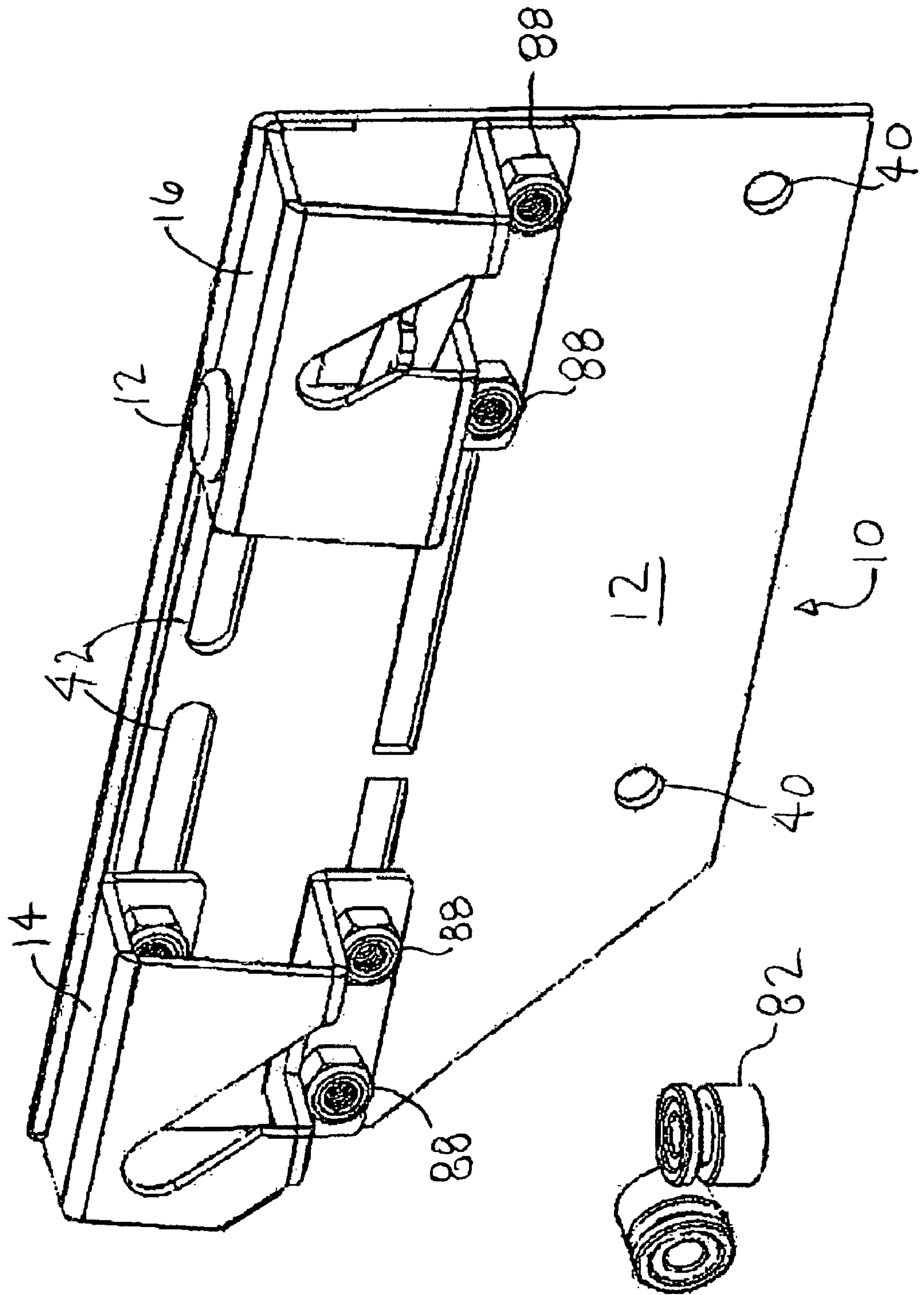
FIG. 31 depicts an angled view of the rear of bracket assembly of FIG. 1 with the keepers in an unengaged position in accordance with one embodiment.
Figure 32:
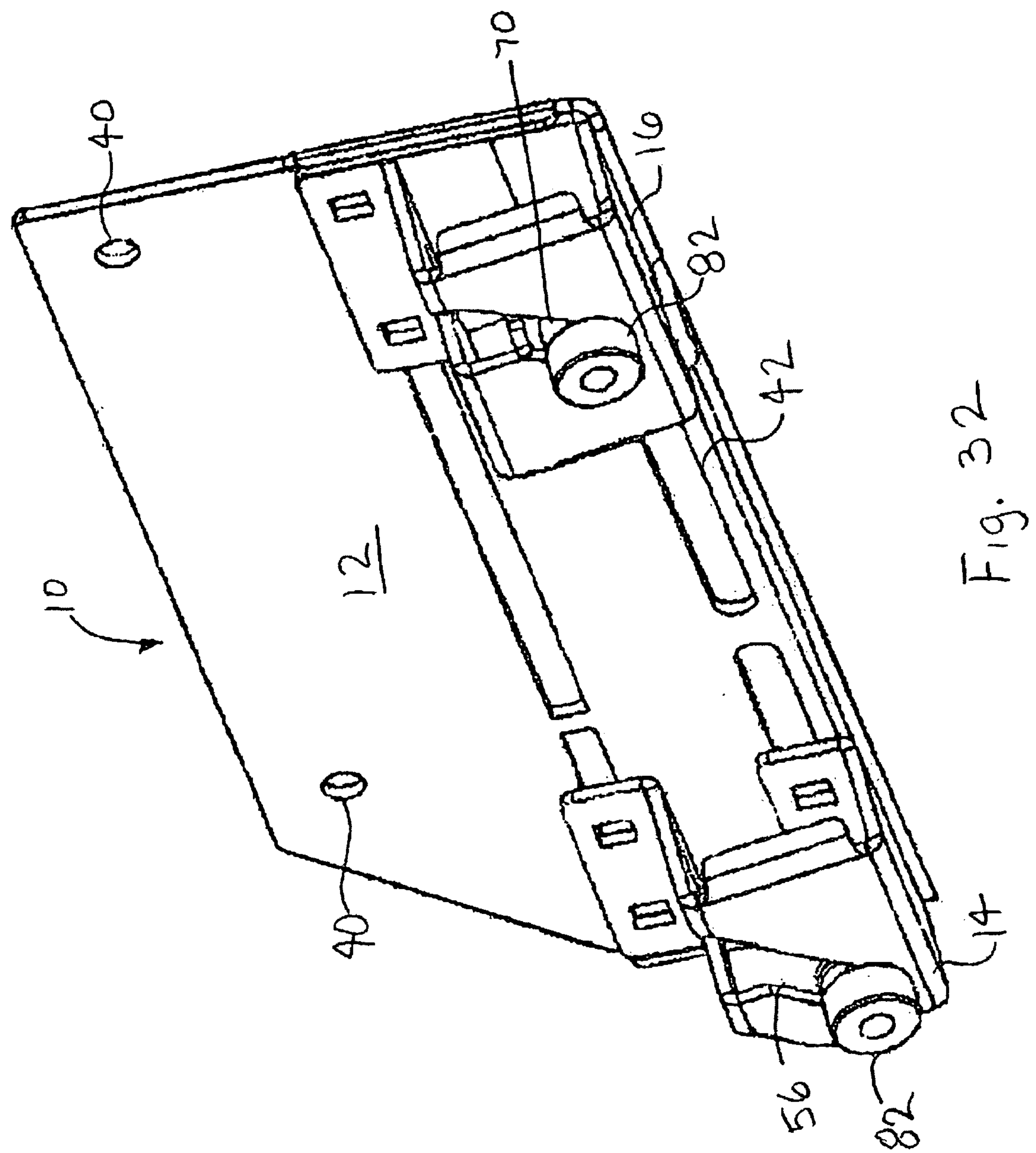
FIG. 32 depicts an angled view of the rear of the bracket assembly of FIG. 1 engaging the keepers in accordance with one embodiment.
Figure 33:
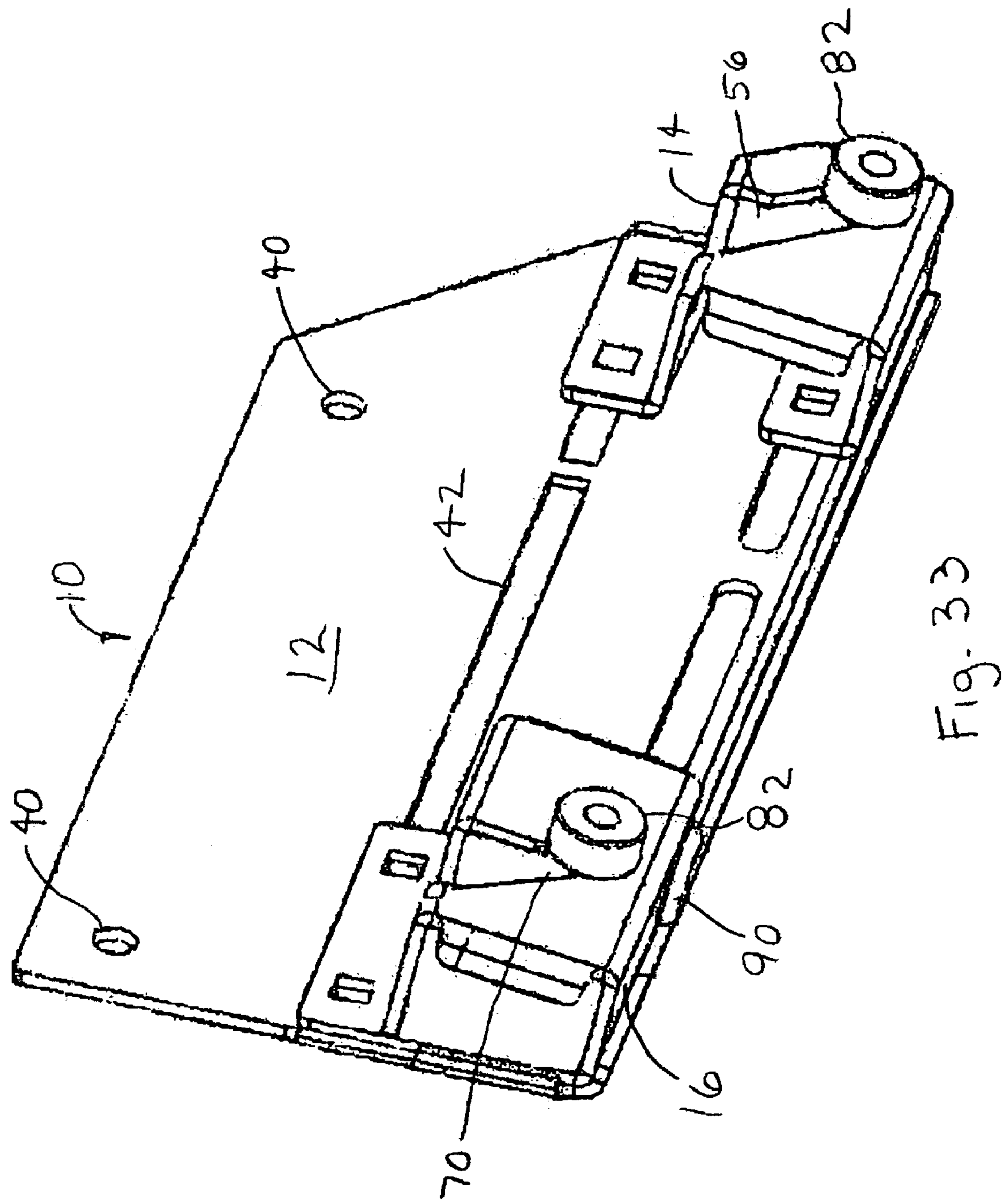
FIG. 33 depicts another angled view of the rear of the bracket assembly of FIG. 1 engaging the keepers in accordance with one embodiment.

FIG. 31 depicts an angled view of the rear of bracket assembly 10 of FIG. 1 with the keepers 82 in an unengaged position in accordance with one embodiment, while FIGS. 32 and 33 depict an angled view of the rear of the bracket assembly 10 of FIG. 1 engaging the keepers 82, and locking arm 72 (or tab 78 thereof) engaging slot 84 of keeper 82.

Figure 34:
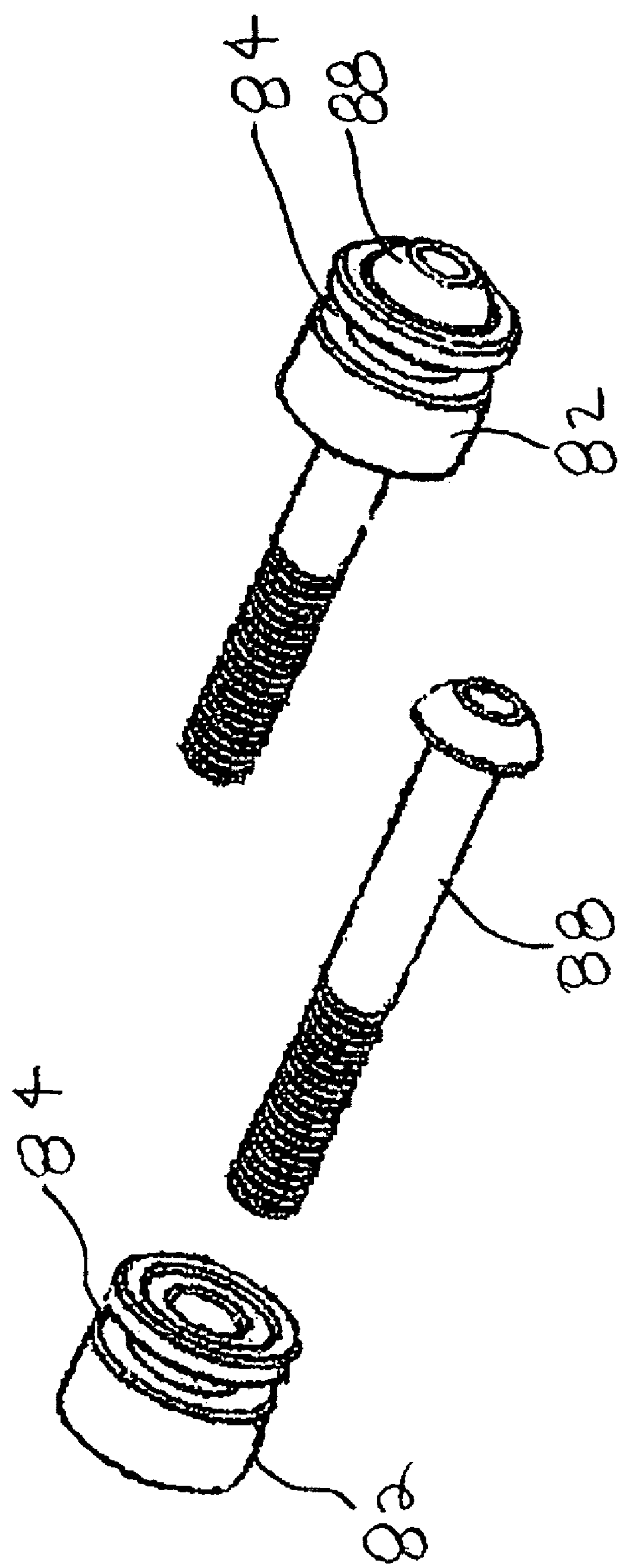
FIG. 34 depicts the bolts and keepers of FIG. 30 in accordance with one embodiment.
Figure 35:
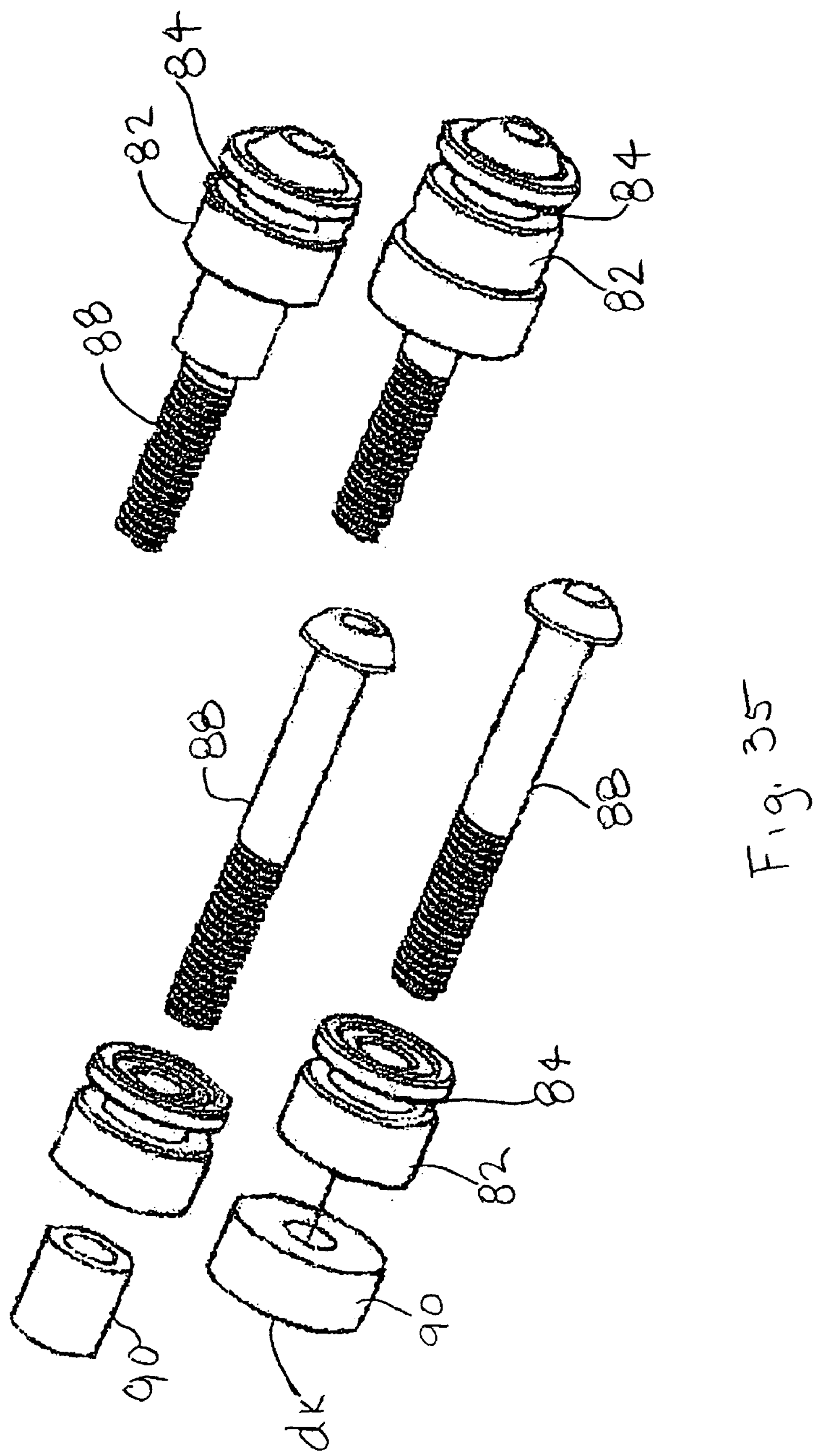
FIG. 35 depicts a view of the bolts, keepers and spacers of FIG. 30 in accordance with one embodiment.

FIGS. 34 and 35 depict the bolts 88 and keepers 82 of FIG. 30 in accordance with one embodiment. In at least one embodiment, bolts on the fender strut corresponding with the receivers on the bracket are removed. FIG. 34 depicts button-head bolts being inserted through the keepers 82, wherein at least the keepers having diameter "$d_k$". FIG. 35 depicts spacers (1-3 washers for example) used with the bolts under that keepers 82 to align the front and rear slotted keepers (See FIG. 5).

Figure 36:
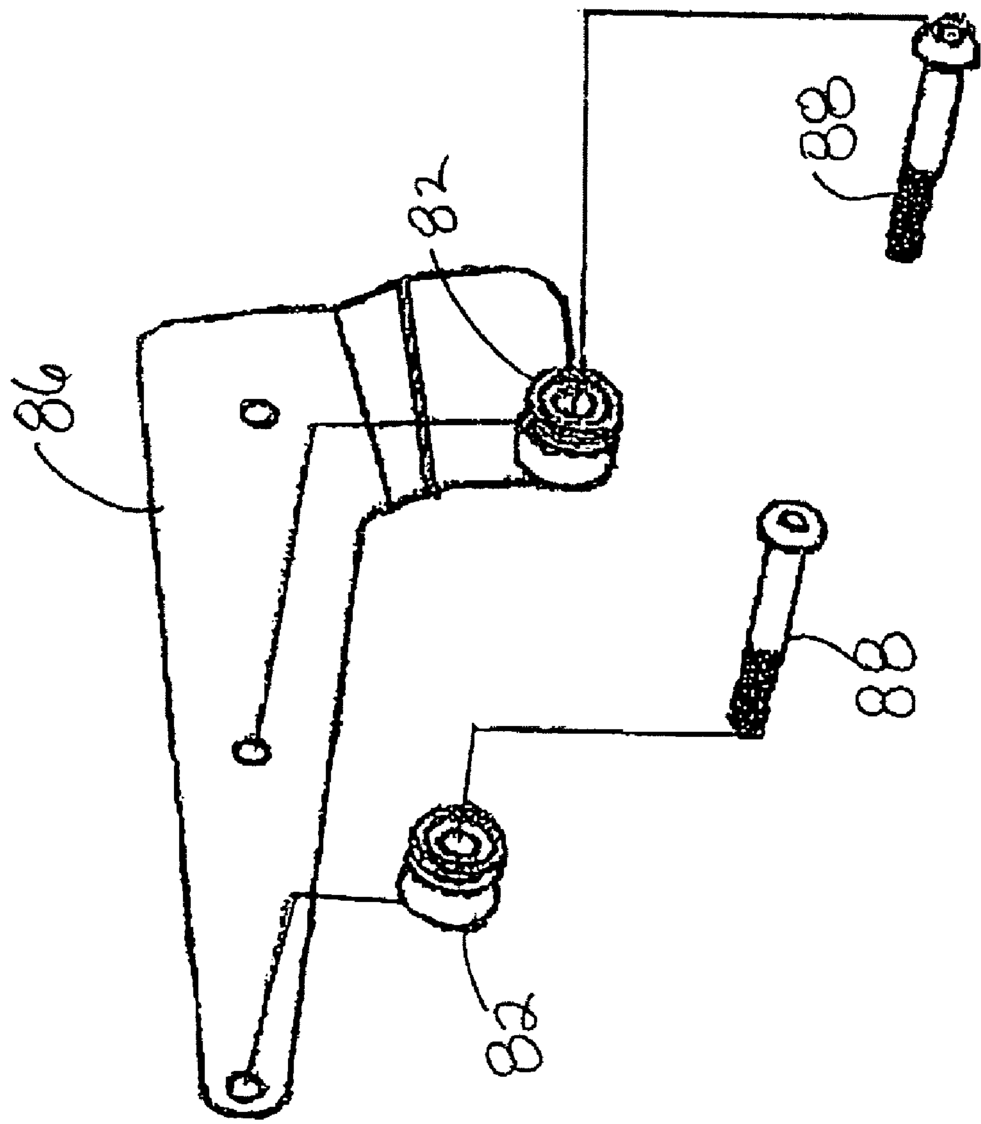
FIG. 36 depicts the bolts and keepers engaging the vehicle fender strut in accordance with one embodiment.
Figure 37:
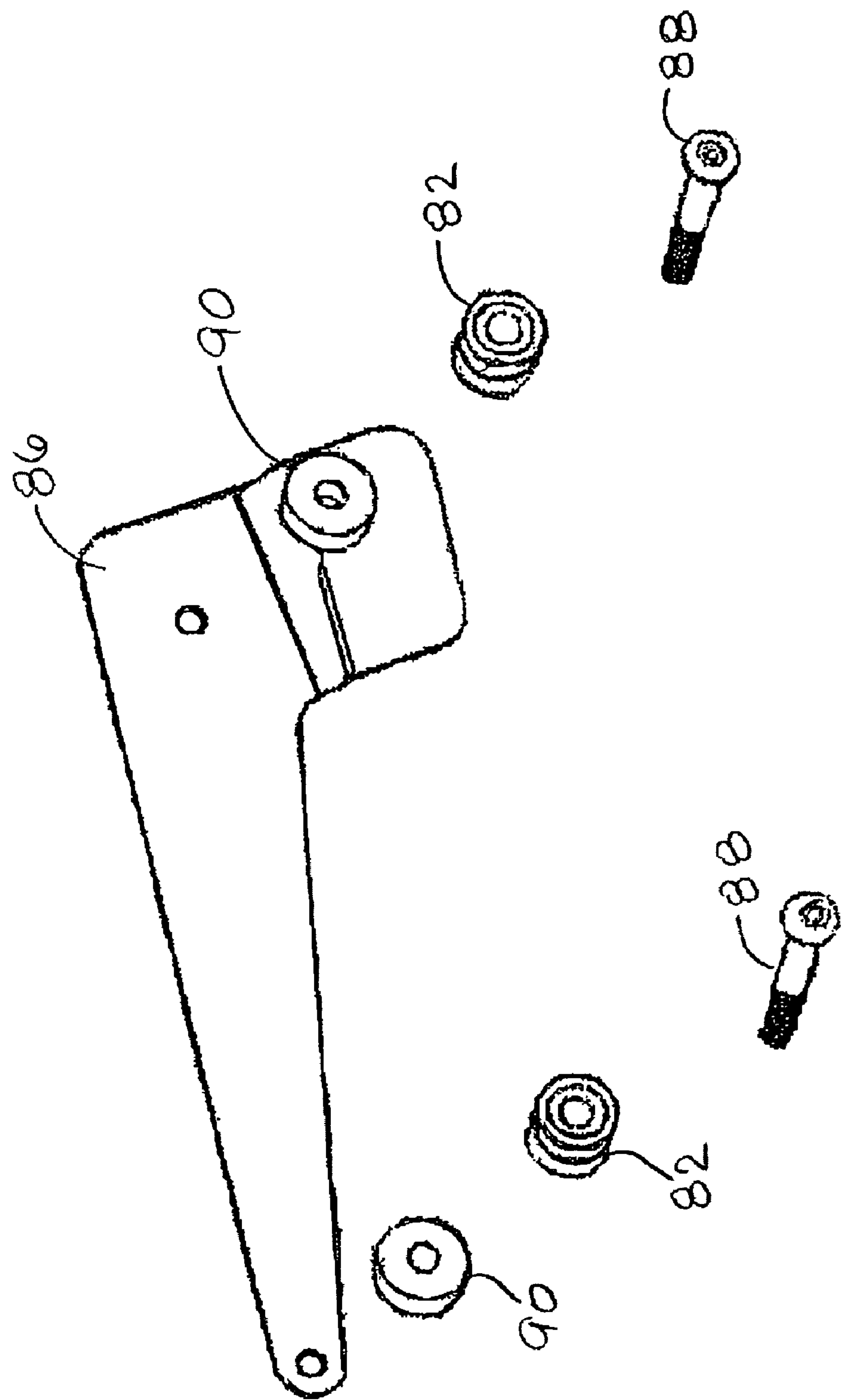
FIG. 37 depicts a view of the bolts, keepers and spacers engaging the vehicle fender strut in accordance with one embodiment.
Figure 38:
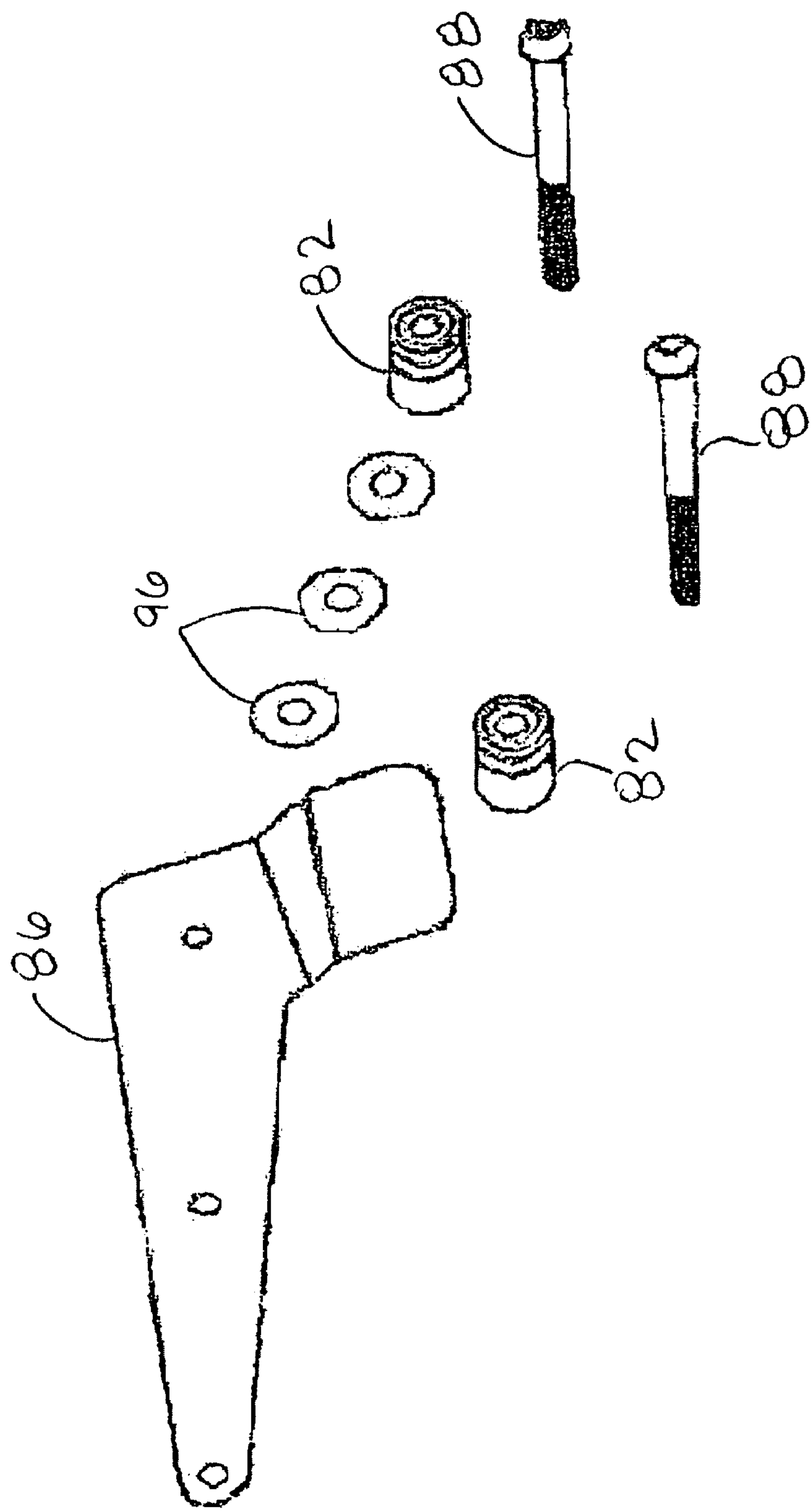
FIG. 38 depicts still a view of the bolts, keepers and washers engaging the vehicle fender strut in accordance with one embodiment.
Figure 39:
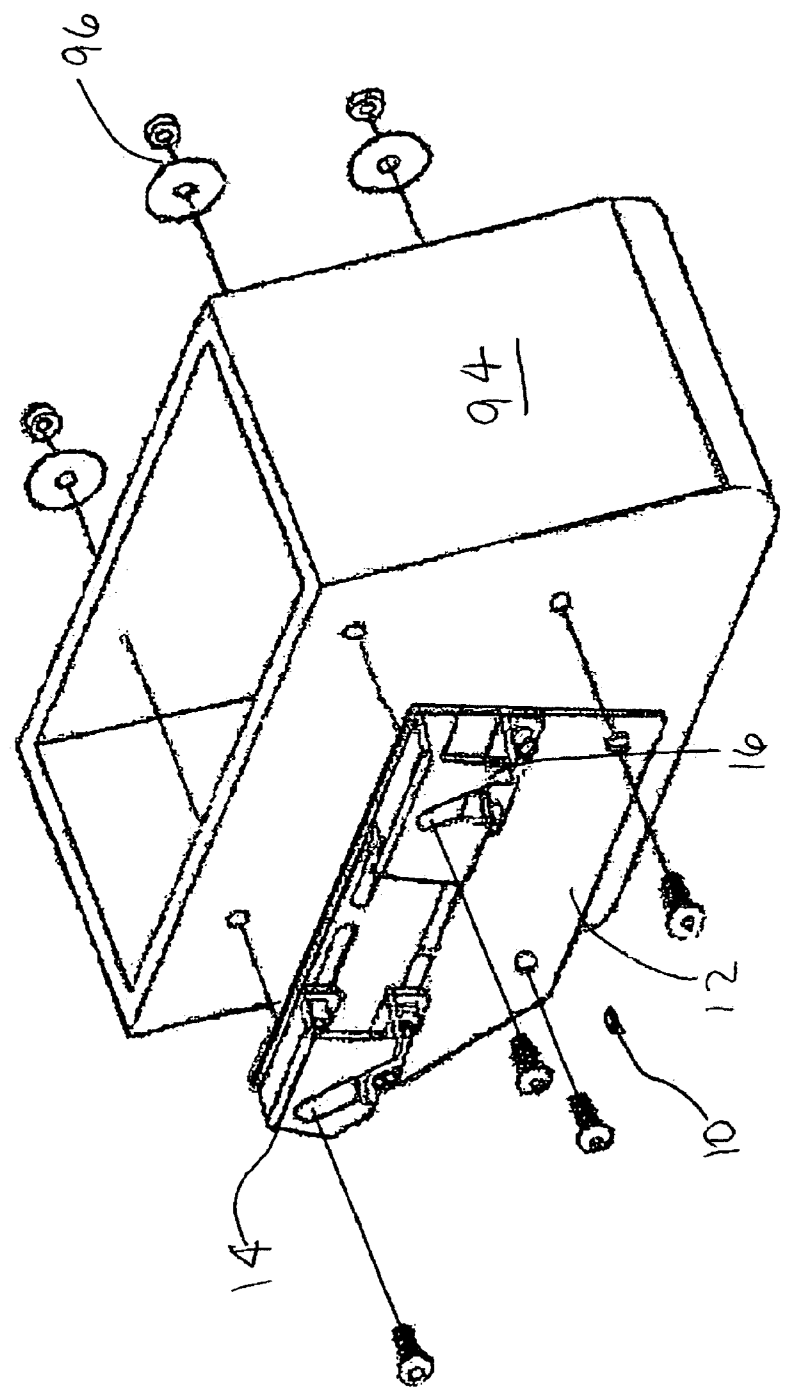
FIG. 39 depicts an angled view of the saddle bag engaging the bracket assembly of FIG. 1 in accordance with one embodiment.

FIGS. 36-38 depict the bolts 88 and keepers 82 engaging the vehicle fender strut 86 in accordance with one embodiment. FIG. 39 depicts an angled view of the saddle bag 94 engaging the bracket assembly 10 of FIG. 1 in accordance with one embodiment.

Figure 40:
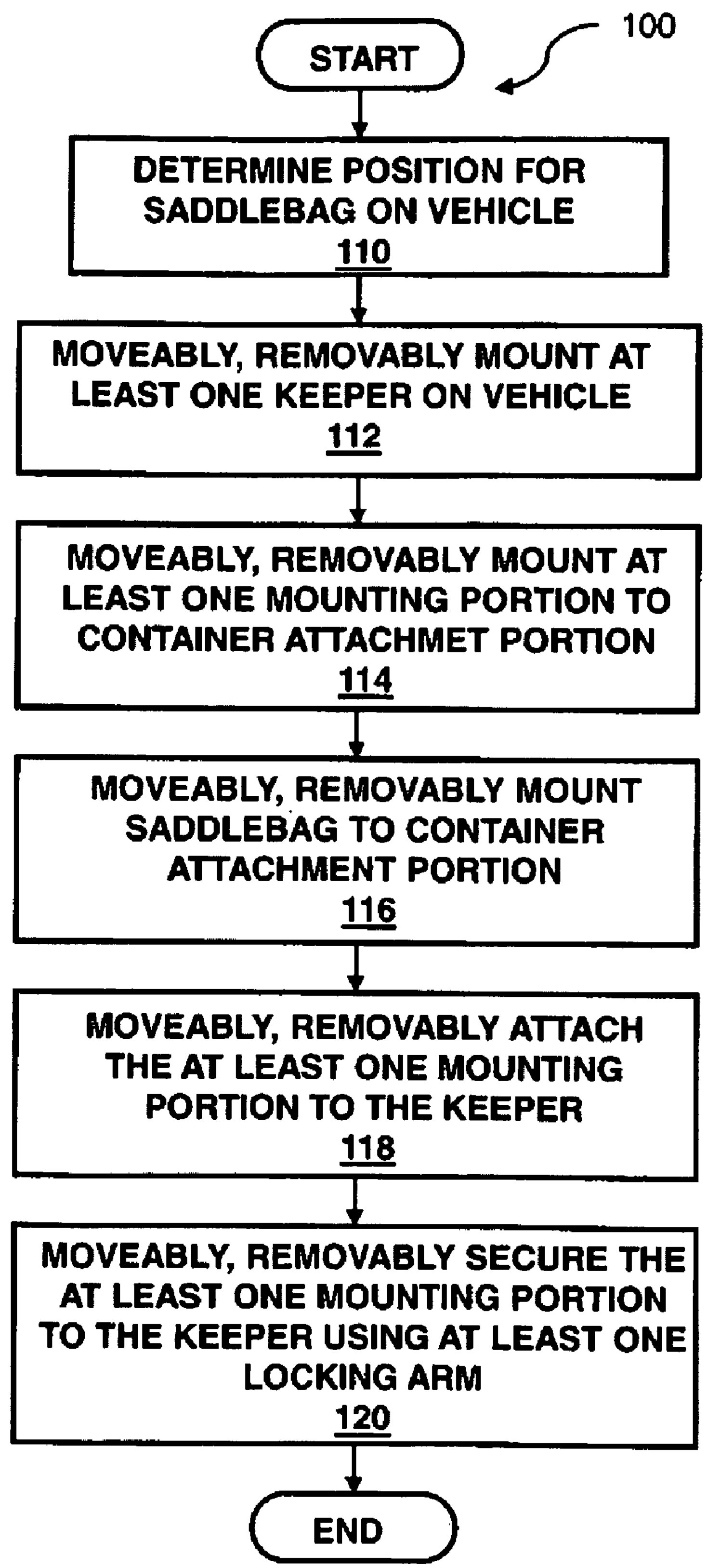
FIG. 40 depicts a flow chart illustrating a method for moveably, removably mounting a saddlebag to a vehicle using an adjustable bracket assembly of FIG. 1 in accordance with one embodiment.
Figure 41:
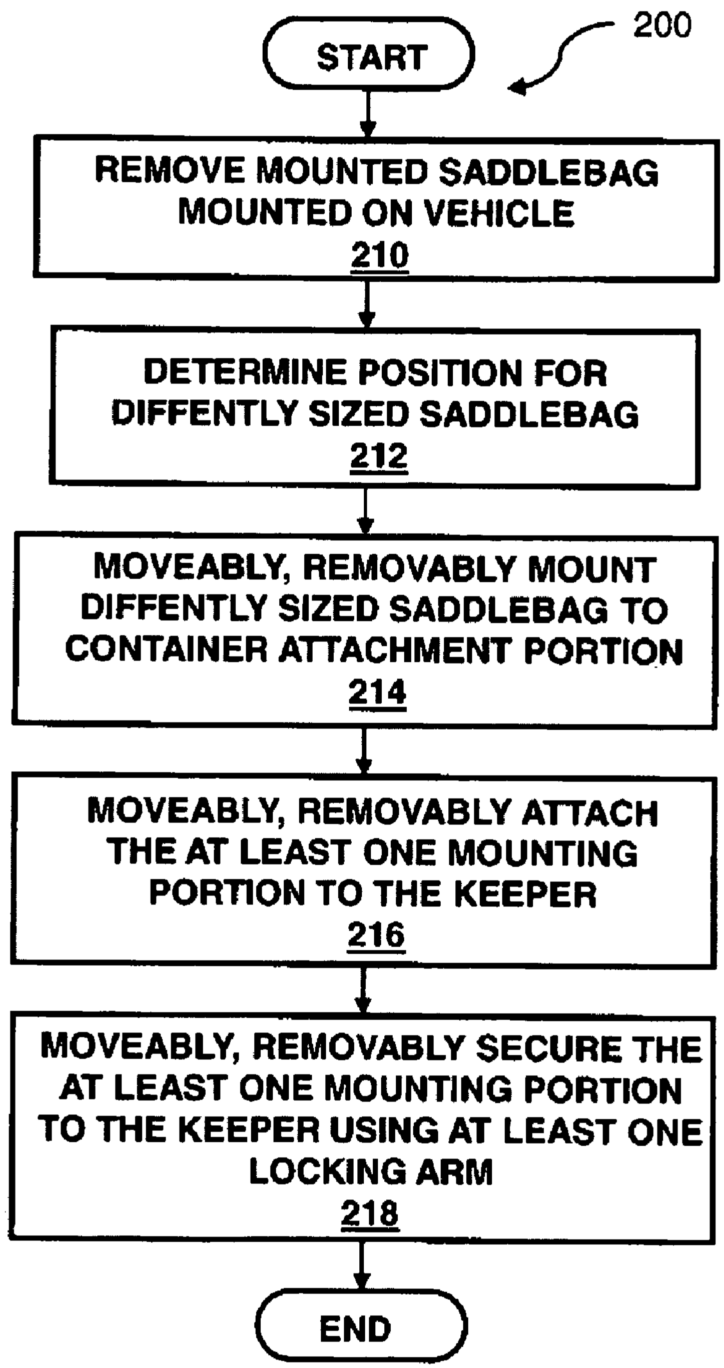
FIG. 41 depicts a flow chart illustrating a method for swapping differently sized saddlebag for a mounted saddlebag mounted to or on a vehicle having a keeper using an adjustable bracket assembly.

FIG. 40 depicts a flow chart illustrating a method, generally designated 100, for moveably, removably mounting a saddlebag to a vehicle using an adjustable bracket assembly of FIG. 1 in accordance with one embodiment. In this embodiment, the method 100 comprises determining a position for the saddle bag on the vehicle, block 110, and moveably, removably mounting a keeper and elongated support member on the determined position on the vehicle, block 112. The method further comprises moveably, removably mounting at least one mounting portion to a substantially planar container attachment portion, block 114 and moveably, removably mounting the saddlebag to the substantially planar container attachment portion, block 116. Additionally, the method 100 further comprises moveably, removably attaching the at least one mounting portion to the keeper, block 118 and moveably, removably securing the at least one mounting portion to the keeper using at least one locking arm, block 120. In at least one embodiment, moveably, removably mounting the at least one mounting portion to a substantially planar container attachment portion comprises moveably, removably mounting at least first and second mounting portions FIG. 41 depicts a flow chart illustrating a method, generally designated 200, for swapping or changing a saddlebag, where the saddlebag is the same or differently sized (different in length, height, width, depth and/or shape). Further the saddlebag may be mounted in a new or different position on the same vehicle or moved to a different vehicle using an adjustable bracket assembly. In this embodiment, method 200 comprises removing the mounted saddle bag mounted in a first position on the vehicle, block 210. This requires unsecuring or unlocking at least one locking arm and determining a position for the differently sized saddle bag on the vehicle.

Method 200 further comprises moveably, removably mounting the saddlebag (a second, differently sized or the same saddle bag) to a substantially planar container attachment portion having at least one mounting portion attached thereto, block 214, which is turn is mounted to the keeper and elongated support member, using the least one locking arm, block 216. The mounting portion is moveably, removably secured to the keeper using at least one locking arm, block 218.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An adjustable bracket assembly for mounting to a vehicle, the bracket assembly comprising:

an integral planar attachment portion including a reception portion therein and coplanar therewith, at least the reception portion including at least one slot;

at least one integral attachment mounting portion separate from the planar attachment portion and including an engaging portion and a mating portion to engage the reception portion, wherein at least the engaging portion is parallel to the planar attachment portion when engaged, the engaging portion including a receiving portion having diameter "$d_{rc}$" and a radius portion in fluid communication with the receiving portion, the radius portion having diameter "$d_{rd}$", wherein $d_{rc}>d_{rd}$, the mating portion is substantially perpendicular to the engaging portion, the mating portion defining at least one hole;

at least one integral locking portion separate from and engaging the attachment portion;

at least one elongated lock adapted to removably engage the hole in the mating portion; and at least one integral keeper to mate with at least the radius portion, the keeper having a diameter "$d_k$", wherein $d_{rd}-d_k=\alpha$ wherein as $\alpha$ approaches a manufacture tolerance, $d_{rd}$ approaches and is substantially equal to $d_k$.

2. The bracket assembly of claim 1 wherein the receiving portion has an axis "$a_{rc}$" and the radius portion has an axis "$a_{rd}$", wherein $a_{rc}$ and $a_{rd}$ define an acute angle.

3. The bracket assembly of claim 1 wherein the locking portion comprises at least one locking member to mate with at least the keeper.

4. The bracket assembly of claim 3 wherein the locking member includes at least one tab to mate with at least one of the receiving portion and the radius portion.

5. The bracket assembly of claim 4 wherein the locking member defines at least one slot to mate with a locking device.

6. The bracket assembly of claim 1 further comprising at least one elongated support member to mate with the at least one attachment mounting portion.

7. An adjustable bracket assembly for mounting to a motor cycle, the bracket assembly for moveably, removably receiving a saddle bag, the adjustable bracket comprising:

an integral planar attachment portion including a reception portion incorporated therein and coplanar therewith, at least the reception portion including at least one slot;

at least two integral attachment mounting portions separate from the planar attachment portion for removably receiving the saddle bag and each of the attachment mounting portions including an engaging portion and a mating portion to engage the reception portion, wherein at least the engaging portion is parallel to the planar attachment portion when engaged, the engaging portion including a receiving portion having diameter "$d_{rc}$" and an axis "$a_{rc}$", and a radius portion in fluid communication with the receiving portion, the radius portion having diameter "$d_{rd}$" and an axis "$a_{rd}$", wherein $d_{rc}>d_{rd}$ and $a_{rc}$ and $a_{rd}$ define an acute angle, at least one of the mating portions defining at least one hole;

at least one integral locking portion separate from and engaging the attachment portion;

at least one elongated lock adapted to removably engage the hole in the mating portion; and at least one integral keeper to mate with at least the radius portion, the keeper having a diameter "$d_k$", wherein $d_{rd}-d_k=\alpha$ wherein as $\alpha$ approaches a manufacture tolerance, $d_{rd}$ approaches and is substantially equal to $d_k$.

8. The bracket assembly of claim 7 wherein the locking portion comprises at least one locking member to mate with at least the keeper.

9. The bracket assembly of claim 8 wherein the locking member includes at least one tab to mate with at least one of the receiving portion and the radius portion.

10. The bracket assembly of claim 9 wherein the locking member defines at least one slot to mate with a locking device.

11. A saddle bag assembly for moveably, removably mounting to a motorcycle the saddle bag assembly comprising:

a saddle bag; and an adjustable bracket assembly adapted to receive the bracket and be mounted to the motorcycle:

an integral planar attachment portion including a reception portion incorporated therein and coplanar therewith, at least the reception portion including at least one slot;

at least two integral attachment mounting portions separate from the planar attachment portion for removably receiving the saddle bag and each of the attachment mounting portions including an engaging portion and a mating portion to engage the reception portion, wherein at least the engaging portion is parallel to the planar attachment portion when engaged, the engaging portion including a receiving portion having diameter "$d_{rc}$" and a radius portion in fluid communication with the receiving portion, the radius portion having diameter "$d_{rd}$", wherein $d_{rc}>d_{rd}$, at least one of the mating portions is substantially perpendicular to the engaging portion, the mating portion defining at least one hole;

at least one integral locking portion separate from and engaging the attachment portion;

at least one elongated lock adapted to removably engage the hole in the mating portion; and at least one integral keeper to mate with at least the radius portion, the keeper having a diameter "$d_k$", wherein $d_{rd}-d_k=\alpha$ wherein as $\alpha$ approaches a manufacture tolerance, $d_{rd}$ approaches and is substantially equal to $d_k$.

* * * * *